(12) United States Patent
Lee et al.

(10) Patent No.: US 8,297,605 B2
(45) Date of Patent: Oct. 30, 2012

(54) MULTIPURPOSE BALL JOINT ASSEMBLY AND WORK HOLDING DEVICES

(75) Inventors: Kevin J. Lee, Leeds, UT (US); Tony James Berry, St. George, UT (US)

(73) Assignee: Berry's Manufacturing, Inc., St. George, UT (US)

( * ) Notice: Subject to any disclaimer, the term of this patent is extended or adjusted under 35 U.S.C. 154(b) by 367 days.

(21) Appl. No.: 12/589,990

(22) Filed: Nov. 2, 2009

(65) Prior Publication Data

US 2011/0101192 A1      May 5, 2011

(51) Int. Cl.
- B25B 1/22    (2006.01)
- B25B 1/04    (2006.01)
- B25B 5/04    (2006.01)
- B25B 27/14    (2006.01)

(52) U.S. Cl. .......... 269/75; 269/131; 269/130; 269/237; 29/281.1

(58) Field of Classification Search .................. 269/131, 269/75, 143, 130, 43, 45, 237, 108, 277; 248/181.1; 29/281.1

See application file for complete search history.

(56) References Cited

U.S. PATENT DOCUMENTS

| | | | | |
|---|---|---|---|---|
| 3,724,844 A | * | 4/1973 | Olmstead et al. | 482/61 |
| 5,069,433 A | * | 12/1991 | Womack | 269/277 |
| 5,224,692 A | * | 7/1993 | Anderson et al. | 269/75 |
| 6,145,823 A | * | 11/2000 | Moushon et al. | 269/254 R |
| 6,574,899 B1 | * | 6/2003 | Mostello | 42/94 |
| 6,726,072 B2 | * | 4/2004 | Rugh | 224/269 |
| 7,111,836 B1 | * | 9/2006 | West | 269/75 |

* cited by examiner

*Primary Examiner* — Monica Carter
*Assistant Examiner* — Seahee Yoon
(74) *Attorney, Agent, or Firm* — M. Reid Russell

(57) ABSTRACT

A ball joint assembly that is a movable mount for a work holding device for holding an item, such as a rifle or pistol, where the ball joint assembly is for seating on, or mounting onto, a table top, bench, or like surface. The ball joint assembly includes a cylindrical housing slotted on opposite sides thereof from a center opening in the housing top and contains a ball that rests on a plunger top end of a jacking screw that is turned in a round nut by a lever arm, and the ball joint assembly is fitted into the housing. Turning of the lever arm that is fitted through a housing lateral slot extends the plunger top into the ball, lifting the ball to lock it against a housing top concave surface, and which ball includes a stem extending through the housing top to tilt between the slots and pivot when the ball in unlocked, and the ball stem end includes a tool mounting for connection to the work holding devices.

9 Claims, 17 Drawing Sheets

MULTIPURPOSE BALL JOINT ASSEMBLY AND WORK HOLDING DEVICES

BACKGROUND OF THE INVENTION

1. Field of the Invention

This invention relates to a multipurpose ball joint assembly, where the ball joint assembly allows both rotational and tilting movement of the holding device and is easily locked in place and released by a quick release handle and couples to a number of work holding devices.

2. Prior Art

The present invention is a ball joint assembly that includes a stem for mounting a number of work holding devices that each holds an item, such as a fire arm, archery bow, and the like, to allow an operator to perform repairs or adjustments thereon. The ball joint assembly incorporates a right hand pivot arm ball joint lock that is capable of allowing a user to freely rotate and tilt an item being worked on that is connected to the ball stem, and, by locking the ball, provides for maintaining the item being worked on in a variety of positions. The, present invention provides for conveniently locking and maintaining the ball of the ball joint assembly in a housing so as to allow an operator to exert significant forces on to an item that as they are working on without slippage to the positioning of the work holding device. Additionally, the present invention affords a user with the ability to easily change the type of work mounting device as they connect to the ball joint assembly of the invention. With such work mounting devices including: but are not limited to, a rifle cradle structure that holds a rifle between a barrel rest end and a rifle stock butt end support; a rifle cradle with an arrangement for controlled vertical and horizontal movement of the rifle butt that includes knob operated vernier controls for use as a shooting stand; a pistol support that includes an adapter having the shape of the pistol magazine that is fitted into the pistol magazine receiving cavity; and a mounting device that maintains an archery bow mounted to a main bean so as to be off-set from an edge of a table or bench that the ball joint assembly is mounted to.

Earlier clamping vices for securing an object have included opposing plates or pads that are pushed together or pulled apart with an object clamped between the plates or pads. Such vices, of course, require that the plates push against the object with such force as to prevent the object from moving. The vast majority of vises achieve this force by a screw jack arrangement where the screw is turned to move the plates, with the user applying a number of turns of the screw to cause the plates to move together. To use such clamping device, the user must first position the object between the two plates and then turn the screw jack to move the plates or pads together to secure the object in the vise. With, to reset the object positioning, they must release the screw, reposition the object and repeat the clamping process. This clamping, release, and re-clamping greatly limits the user's ability to optimally position the object at a most convenient position for the user to work on it, and may damage the object being worked on. Whereas, the invention employs a ball and seat combination, where the ball includes a stem or shaft that a work holding device is attached to, providing, with a turning of a single lever arm, for ball locking or unlocking in the seat. Further, as compared to other ball and seat configurations, the invention provides for an easy adjustment of the height of a round nut within a ball housing that a threaded shaft of the single lever arm is turned in, allowing an operator to conveniently reset spacing between the ball and seat surfaces.

Additionally unique to the invention, the ball shaft or stem is not only allowed to rotate within the seat through three hundred sixty (360) degrees, it can also tilt across housing top through an arc of up to and greater than one hundred eighty (180) degrees.

Within the knowledge of the inventor, no earlier vise type device, or even a ball and seat arrangement, has provided versatility and ease of operation of the ball joint assembly of the invention and its attached work holder. Heretofore, clamping devices have limited a user's ability to work on an object, or the structure of such work holding device has forced the user to distort their body to work on the object as when it is clamped in the vise. Distinct from earlier devices, and even devices that have employed a ball and seat vice, the invention allows for externally adjusting the fit between the ball and seat as may have loosened, unlike earlier devices that have required a tear down of the assembly to reset the ball and seat spacing.

Additionally the ball and seat assembly of the invention employs unique work holding arrangements that are, themselves, distinct from earlier arrangements. Unique work holding arrangements of the invention include: a rifle sighting and stand arrangement and an archery bow clamp that are unlike other holding devices in their structure and use.

SUMMARY OF THE INVENTION

It is a principal object of the present invention to provide a ball joint assembly that is supported on, or is for mounting onto a bench or table, and connects to a work support device that will allow a user or operator to easily and quickly adjust positioning of an object held by the work support device, the ball joint assembly thereby provides an operator with the ability to position an object in a number of positions around and across the ball joint assembly housing.

Another object of the present invention is to provide a screw jack operated by a lever to provide for a quick and easy locking and unlocking of the ball of the ball joint assembly so as to allow an operator to quickly and easily change the positioning of an object mounted onto a work support device that is connected to an end of a ball shaft or stem.

Another object of the present invention is to provide for locking and unlocking the ball in the ball joint housing with movement of a single lever only that an operator turns through an arc of travel of less than ninety (90) degrees to lock and unlock the ball in a seat of the ball joint, and includes a simple mechanism for fine position adjustment of a round nut within the ball joint housing that a jacking screw of the lever arm is turned through for adjusting the positioning of the ball in clamping engagement with the seat in the ball joint housing.

Another object of the present invention is to provide a ball joint assembly having a ball wherefrom a shaft or stem extends out from a ball joint assembly housing, and which shaft or stem end is arranged to mount each of a number of work supporting devices attached thereto, and where the shaft or stem end can be turned through three hundred sixty (360) degrees, can be tilted across the ball joint assembly housing through more than one hundred eighty (180) degrees of arc, and the ball can be easily locked and unlocked in a seat in the ball joint assembly housing, to allow the work support device to be easily moved to, and locked in, a number of attitudes.

Still another object of the present invention is to provide a ball joint assembly with a shaft or stem that is arranged for securely maintaining an object or item that an operator can work on such as: a rifle cradle to hold a rifle while work is performed thereon; a rifle shooting rest where the rifle can be fired for sighting in the rifle with the rifle barrel supported in a front cradle and with the rifle stock supported at a butt end; can be a pistol support; can be an archery bow support, or other mounting or mountings for holding an object or item that an operator works on.

Still another object of the present invention is to provide a unique rifle shooting rest where the rifle can be fired for sighting in the rifle, and provides for supporting the rifle barrel in a front cradle and supports the rifle stock at a butt end, where the shooting rest is arranged for attachment to the shaft or stem end of the ball joint assembly or, through an adapter, to another anchoring device.

The present invention is a ball joint assembly that is for connection to a work support device where the work support device holds an item to be worked on by an operator. The ball joint assembly is mounted at its bottom to a T-base for positioning on a work surface, or directly onto a table or work bench.

The ball joint assembly includes a cylindrical housing that has a base for attachment to the T-base, table or work bench, that includes spaced holes that receive fasteners, preferably screws, fitted through the holes and turned into spaced threaded holes that are formed into the bottom edge of the ball joint housing, and which ball joint housing is preferably a cylinder. The bottom of the ball joint housing is open, and includes an arcuate slot in the cylinder side wall that is to accommodate a lever that is preferably bent upward to facilitate gripping by an operator. The lever is attached on one end within the cylinder, as by welding, to a jacking screw shaft end. Which jacking screw has a threaded portion that is axially is fitted into, for turning in, a round nut that is fitted into the ball joint housing and maintained therein by an internal snap ring. With the jacking screw turned therein, the round nut is fitted into the ball joint housing and a snap ring is installed in an internal groove of the ball joint housing, supporting the round nut bottom. The round nut height within the ball joint housing is incrementally adjusted by use of an alien wrench and is locked in place by a set screw that is fitted through the housing wall, preventing the round nut from moving. The round nut includes seven radially spaced sided holes formed in its lower surface that each can receive the alien wrench end fitted therein for incrementally turning the round nut on the jacking screw treads, adjusting the round nut height within the ball joint housing. In practice, with the set screw loosened, the side holes can each receive an end of the allen wrench fitted through the arcuate slot for turning the round nut, providing for a fine adjustment of the round nut positioning within the housing to adjust ball tensioning within its seat in the housing. Whereafter, the set screw is turned to lock the round nut in place. Additionally, a preloaded spring is preferably provided for maintaining pressure on the handle when the jacking screw is turned into the round nut, maintaining pressure against back handle travel as would loosen clamping pressure of the ball against the seat.

The ball of the ball joint assembly is fitted in the ball joint housing, above the round nut, such that the ball of the assembly is positioned on a plunger fitted to the end of the jacking screw that serves as a bearing support. The plunger end allows for both axial and longitudinal travel of the ball. So arranged, a shaft or stem that extends outwardly from the ball can both freely pivot and tilt across the ball joint housing top end.

In fitting the ball joint assembly components together, the ball joint shaft or stem is passed through a center opening formed through a ball joint housing top, and is to travel in a pair of aligned slots that are formed in the ball joint housing wall that intersect the center opening. The aligned slots accommodate the ball joint shaft or stem travel from one side of the housing, across the housing top, to the other side, allowing the shaft or stem to travel through an arc of one hundred eighty (180) degrees and greater. The ball joint housing top is concaved from the open center outwardly to accommodate the ball outer surface, and the radius of the concave surface is approximately the same or slightly greater than the circumference of the ball. Thereby, with the ball shaft or stem centered in the center opening, the ball can be turned through a full three hundred sixty (360) degrees of travel.

The ball shaft or stem upper end section includes a mount that provides for attachment, as with screws, to each of a number of work support devices to include, but not limited to: a rifle cradle; a semi-automatic pistol grip mount that has the shape of a pistol magazine; a rifle sighting support in combination with the T-base that can, by turning adjustment knobs, incrementally move the rifle butt vertically and horizontally; an archery bow mount; and or the like.

In practice, for locking and unlocking the ball to allow for optimum positioning of the shaft or stem end and connected work holder or support device mounting, the lever arm is manually rotated, turning the threaded shaft into the round nut, extending the jacking screw top end whereto the plunger is fitted out from the top of the screw assembly and into engagement with to elevate the ball and urge the opposite ball surface into engagement with the ball joint housing inner concave surface, locking the ball thereto. In that locked attitude, a leaf spring is fitted into the ball joint housing slot, the leafs of the leaf spring engaging, respectively, the slot end and side of the lever arm, to urge lever arm away from the slot end, maintaining the jacking screw top end in position. A locking or releasing of the ball joint in the house depends upon the direction of pivoting of the lever arm to turn the screw shaft end into or out of engagement with the ball surface, and which unlocking movement of the lever arm is resisted by the leaf spring.

The slots formed down opposite sides of the ball joint housing have like U-shapes and are of a like width to accommodate the ball joint shaft or stem travel therein. So arranged, when the lever arm is pivoted so as to move jacking screw head end mounting the plunger, against the biasing of the leaf spring, the ball is released, allowing ball shaft or joint stem to be pivoted through a full circle, and can be tilted, traveling within the slots, across the ball joint house top from one side to the other.

In addition to the ball joint assembly, the invention includes the rifle sighting arrangement comprised of a stand for resting on a flat surface that is formed as a cross. The stand cross has a long straight leg that is parallel and spaced below a rifle cradle that is supported at the junction of the cross legs, and which long leg end is incrementally movable horizontally and vertically. So, arranged, the rifle cradle with a rifle mounted therein is parallel to the long leg such that vertical or horizontal incremental movement of the long leg end are reflected in like movement of the rifle stock butt end, providing for sighting in the rifle.

Also, unique to the invention is the archery bow support that it provides for both a rigid bench or table mount to the ball joint assembly such that an archery bow clamped in an archery bow support will extend across the bench or table edge, and is supported by cushioned clamps that are easily closed together to hold a bow limb in place at an optimum angle to facility performing work thereon.

DESCRIPTION OF THE DRAWINGS

The invention may take physical form in certain parts and arrangement of parts, and preferred embodiments of which will be described in detail in this specification and illustrated in the accompanying drawings, which for a part hereof:

FIG. 5B is an enlarged forward end view, similar to FIG. 5A, only showing the forward end of the rifle support rail that a rifle barrel support cradle is mounted to;

DETAIL DESCRIPTION

Figure 2:
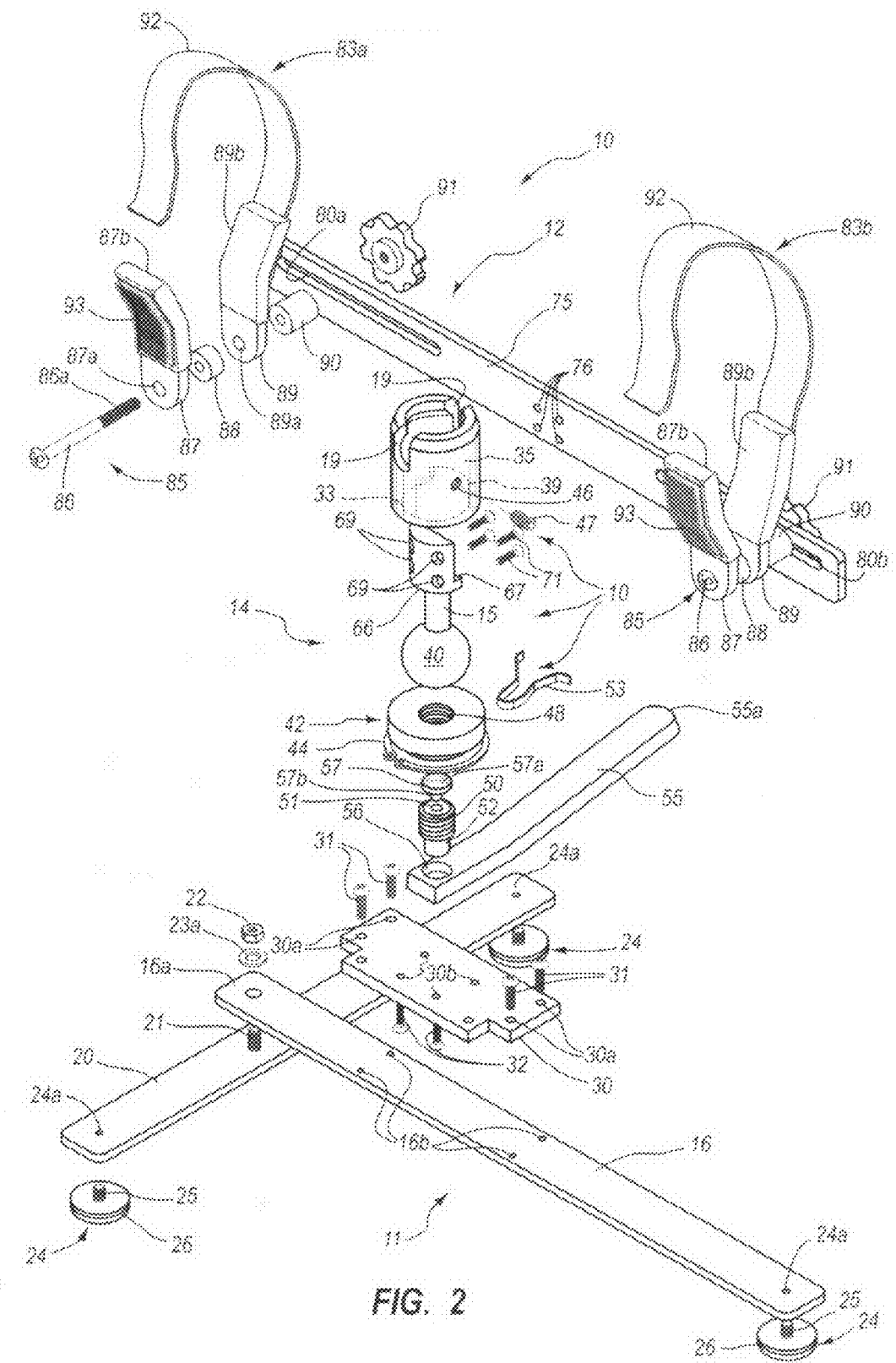
FIG. 2 shows an exploded view of the ball joint assembly, rifle support, T-base and base plate, shows that the rifle support attached to the ball joint assembly ball shaft or stem with the ball joint housing bottom attached to the T-base by screws, and shows a lever arms end hole aligned with an end of a screw shaft whose threads are for fitting into, to turn in an axially threaded center hole of a round nut that is fitted in the ball joint housing, where the screw shaft upper end is shown aligned for fitting to a plunger that, when elevated, contacts and urges the ball of the ball joint assembly into engagement with a concave surface formed in a housing cap that functions as a seat to lock the ball and seat together.

The invention is an arrangement of a ball joint assembly 14 that, as shown in an exploded view of FIG. 2, includes a housing 35 for connection to a base 30 and contains a round nut 42 fitted therein that a jacking screw 50 is turned through that includes a plunger 51 on a top end thereof that a ball 40 rests on. Which ball 40 includes a shaft or stem 15, hereinafter referred to as stem, that extends through a center opening of a housing cap end 36 whose undersurface is curved to accommodate the ball 40 surface there against, acting as a seat. The stem 15 includes an end coupling 66 that attaches to a work holder, that can be a gun support, bow support, or similar work holding device. The ball joint assembly 14 may be fixed to a workbench, may be connected to a variety of bases, and can be used to support a number of work holding devices that each are arranged to maintain an item or items to be worked on by an operator, providing an operator or user with the ability to quickly move an item as they are working on to multiple positions, facilitating their work on the item. The ball 40 and stem 15 can be moved turned through three hundred sixty (360) degrees, shown by arrows C and D, and tilted across the housing top through one hundred eighty (180) degrees, and greater, shown as arrows A and B, respectively, in FIG. 4A, providing for turning and tilting a rifle support cradle 12 around and across the ball joint assembly housing top 36. Further, the ball joint assembly 14 can be arranged to accommodate a variety of work holding devices.

Figure 1:
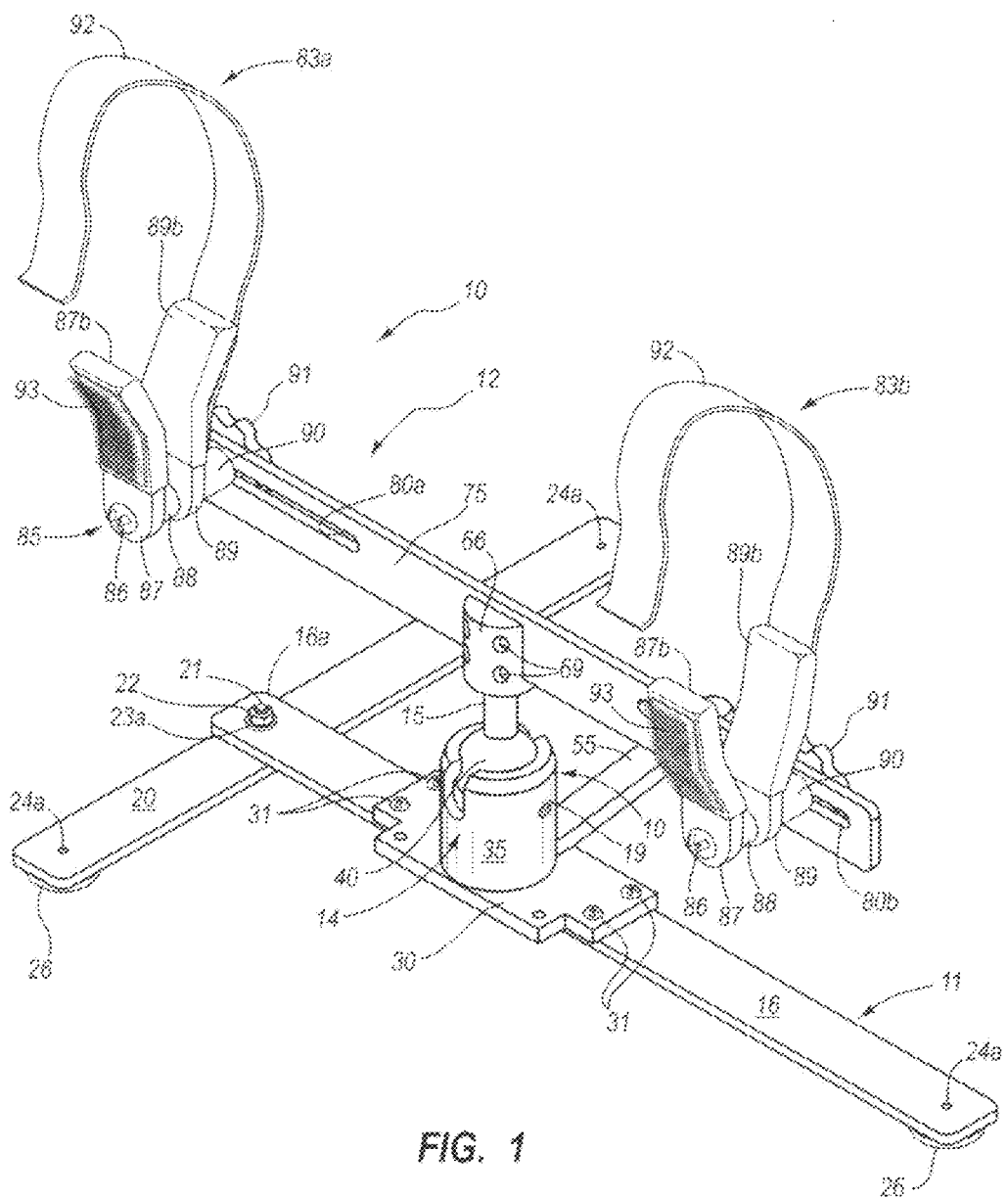
FIG. 1 is a side elevation perspective view of the ball joint assembly of the invention shown attached to a rifle support through a ball joint assembly shaft or stem, with a ball joint assembly housing bottom shown attached to a T-base by a base plate.

FIG. 1 shows a side elevation perspective view of a ball joint assembly 14 of the invention with the rifle support cradle 12, forming a vice 10. Which ball joint assembly 14 is supported to, and extends upwardly from, a T base 11, with the ball stem 15 coupling 66 mounted to a rifle support cradle 12. The ball joint assembly 14, shown in the exploded view of FIG. 2, and as a side elevation view in FIG. 3, mounts the rifle support cradle 12 that includes a rifle 13. Illustrated in FIGS. 1 and 3 the ball joint assembly 14 is shown in a side elevation and is attached through a bottom plate 30 to a base straight flat arm 16 of a T-base 11, by a plurality of screws 31. The ball joint assembly 14 is attached through the shaft or stem 15 to a coupling end 66 that, as shown, is secured to a rail 75. The T-base 11 is shown as including the base arm 16 that connects at an end 16a to a cross arm 20. Which base and cross arm connection is preferably connected by fitting of a bolt 21 whose threaded end is aligned with base and cross arm hole 16a and receives a nut 22 turned thereover. The bolt is fitted through a washer 23a, and is secured in a hole formed through the cross arm 20 center as by brazing, or can be mounted therein utilizing a serrated shank bolt, or by other appropriate arrangement. So arranged, to form the T-base 11. The nut 22 is turned onto the threaded end of the bolt 21. Feet 24, that each include a broad head end 26 and threaded shaft 25, are provided for turning in threaded holes 24a that are formed in an end 16a of the base arm 16, and ends of the cross arm 20, respectively, for supporting the ball joint assembly 14 on a flat surface.

Figure 3:
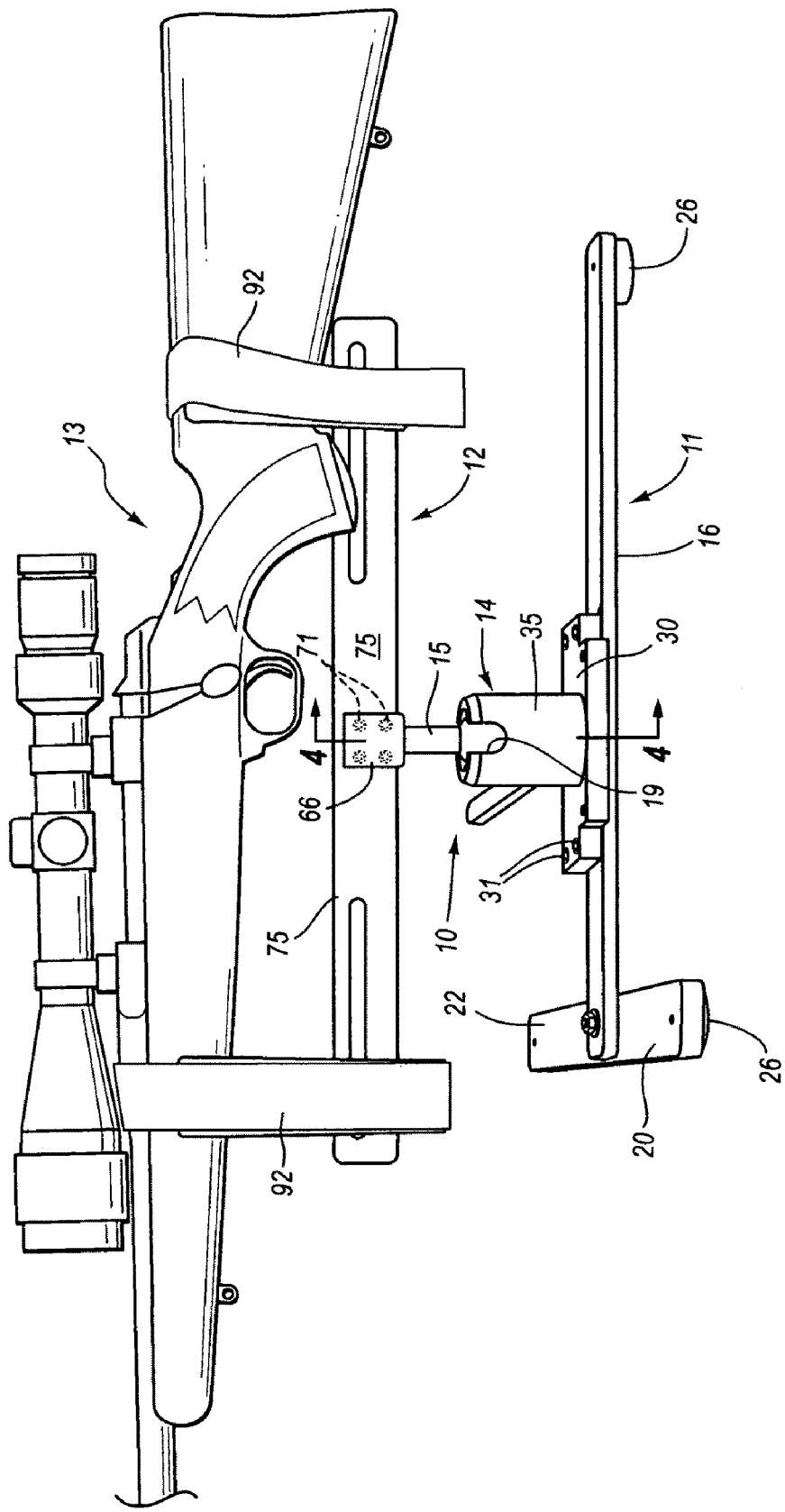
FIG. 3 shows the ball joint assembly of FIG. 1 with the base plate attached to the T-base support, with the rifle support attached to the ball shaft or stem end, and shows a rifle secured by straps to the rifle support.
Figure 4A:
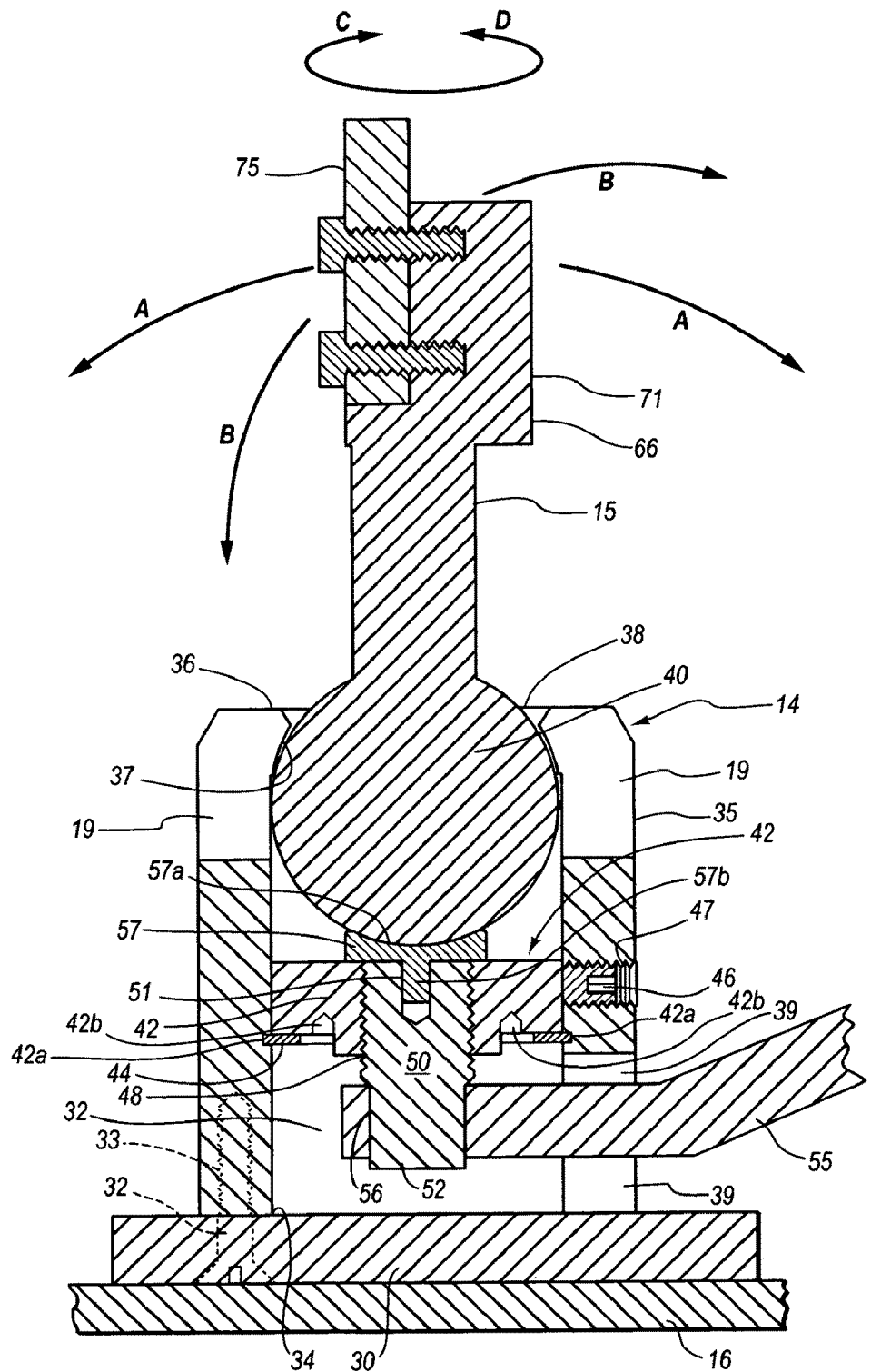
FIG. 4A shows a side elevation sectional view taken within the line 4-4 of FIG. 3, showing the ball joint assembly components including the ball joint housing, screw assembly and lever arm, and shows with curved arrows A, B, C and D, the movement capabilities of the ball of the ball joint assembly.
Figure 4B:
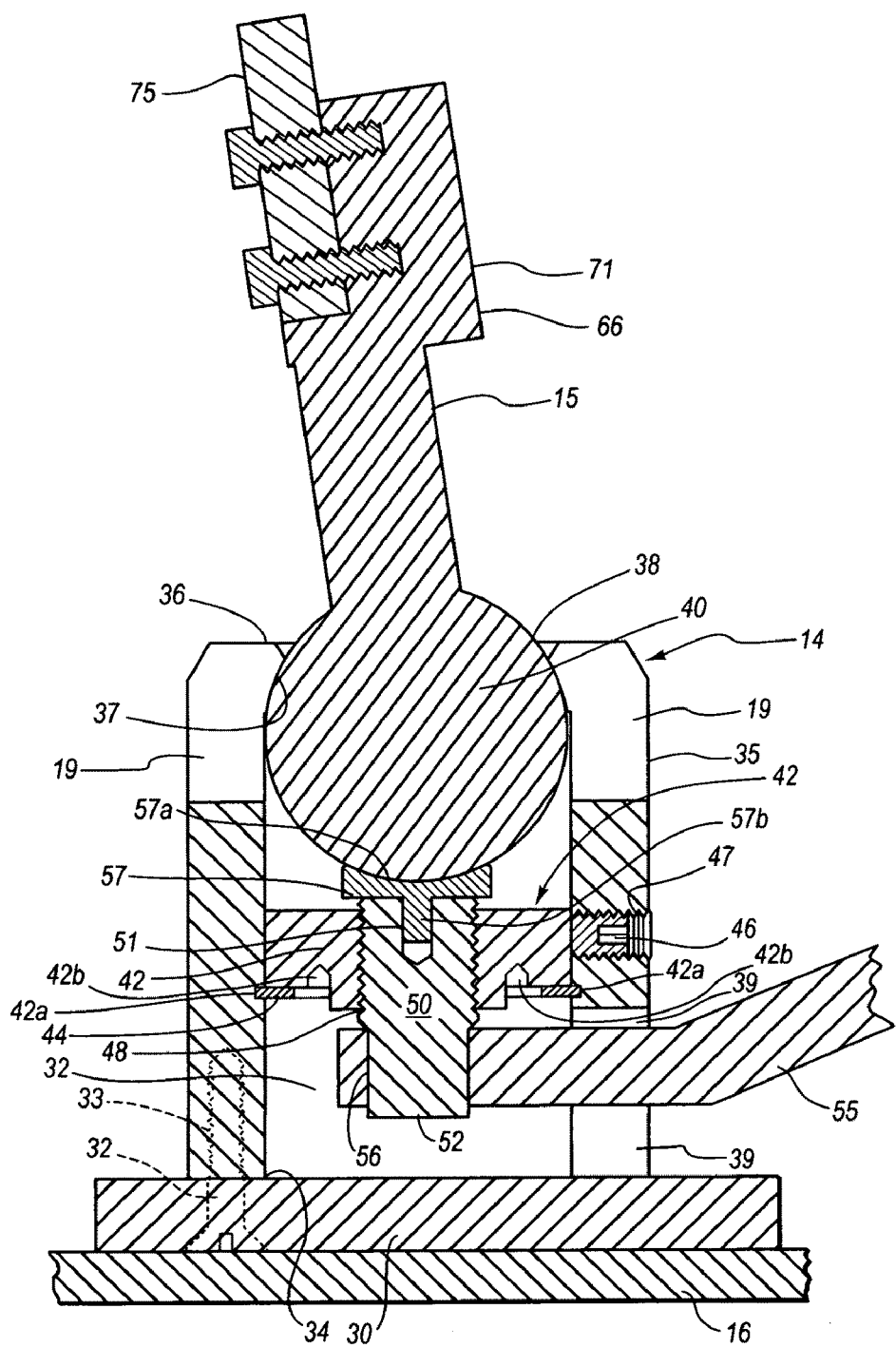
FIG. 4B shows the sectional view of the ball joint assembly of FIG. 4A, showing the ball and ball shaft or stem tipped toward a slot formed in the ball joint housing.

The ball joint assembly 14 affords an operator with a capability to turn the ball stem 15 and attached rail 75 through three hundred sixty (360) degrees, shown by arrows C and D in FIG. 4A, and across the ball joint assembly 14 top 36, shown by arrows A and B in FIG. 4A. Which ball joint assembly 14 is shown in the exploded perspective view of FIG. 2 and in the sectional views of FIGS. 4A and 4B. The ball joint assembly 14 includes a base plate 30 that is secured onto a top surface of the base arm 16 by bolts 31 that are fitted through holes 30a formed through corners of the base plate and turned into threaded holes 16b formed in the T-base leg 16. Prior to which base plate 30 attachment, the assembled ball joint assembly 14, that has the components thereof already fitted therein, as set out below, is mounted by fitting of screws 32 through base plate holes 30b that are turned into threaded holes 33. Which threaded holes 33 are formed at spaced intervals around a base end 34, shown in FIGS. 4A and 4B, of a ball joint assembly housing 35, mounting the ball joint assembly housing onto the base plate 30. FIGS. 4A and 4B show the ball joint assembly housing 35 as having a cylindrical shape with a cap or top 36 that has a concave inner surface 37 and is open at a round hole 38 formed through its center. The arc of which concave inner surface 37 is essentially that of a ball 40 surface, allowing the ball to slide thereover until the ball 40 surface is urged against the housing concave inner surface 37, functioning as a ball and seat, as set out below. Additionally, the ball joint assembly housing 35 has a horizontal arcuate slot 39 that has an arc of approximately ninety (90) degrees, removed from a section of base end 34, as shown in FIGS. 4A and 4B and in broken lines in FIG. 2, that a lever handle 55 travels back and forth within, as set out below, and, as shown in FIGS. 1 through 3. The top section of the ball joint housing 35 has aligned slots 19 cut therein across the housing top portion and into the housing. Which slots 19 are of a width to allow the ball 40 stem 15 to travel into and along. Thereby, the stem 15 can travel through an arc of approximately one hundred eighty (180) degrees across the ball joint housing 35 top 36, as shown in FIGS. 1 through 4B and 6, as discussed below.

In assembling the ball joint assembly 14, as shown in the exploded view of FIG. 2, and the sectional views of FIGS. 4A and 4B, the ball 40 is fitted into the ball joint housing 35, such that the stem 15 travels through the center hole 38 formed in the housing top 36 to where the ball 40 surface will nest against top 36 concave inner surface 37. The ball seat assembly 14, includes the round nut 42 that has a smooth outer surface and inner threads 35a that receive the jacking screw 50 with attached handle 55 turned therein followed by a snap ring 44. The snap ring 44 travels along the ball joint housing smooth inner wall to a slot 42a formed therein that captures the snap ring 42a that holds round nut 42 thereabove in the ball joint housing 35. The ball 40 thereby rests on a plunger 57 top 57a that is fitted across top 51 of the jacking screw 50 that has been turned along inner threads 48 to extend through the round nut 42 top. Thereby, with the ball joint assembly 14 fitted together, the plunger 57 top 57a will engage the ball 40 surface.

Shown in FIGS. 4A and 4B, a set screw 47 is provided for turning through a threaded hole 46 in the wall of the ball joint housing 35 that engages the side of the round nut 42 of the ball seat assembly 14 to contact and lock the round nut 42 in position after it has been positioned in the ball joint housing. The round nut 42 of ball seat assembly 14, shown in FIGS. 2, 4A and 4B, is positioned to provide appropriate spacing of the jacking screw 50 top surface 51 plunger 57 top 57a to the ball 40 of the ball seat assembly 14. Which selected spacing is such that, when the jacking screw 50 is turned appropriately, the plunger top 57a will move the ball 40 to where the ball 40 surface is forced against the inner concave surface 37 of the ball joint housing 35 top 36, locking the ball 40 to the inner concave surface 37. So arranged, by turning the jacking screw 50 so as to move its plunger 57 top end 57a into engagement with the ball 40 surface, the ball will be securely locked in place in the housing 45, until the jacking screw 50 is turned oppositely. Turning of the jacking screw 50 is provided by a lever arm 55 that has an end hole 56 that a jacking screw 50 cylindrical end 52 is secured into as by welding, brazing, by use of a serrated shank bolt, or other appropriate arrangement, and which lever arm 55 preferably is bent slightly upward across is longitudinal axis and has a rounded end 55a to facilitate gripping by an operator.

Figure 4C:
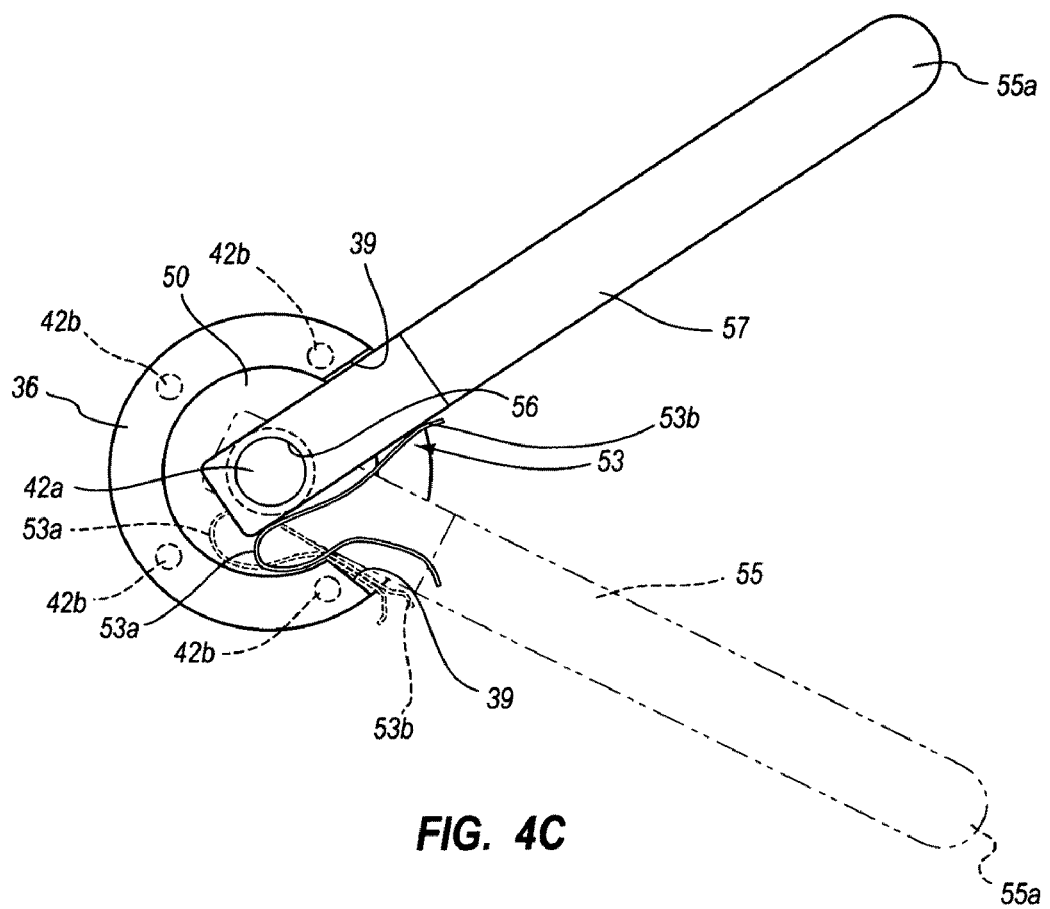
FIG. 4C shows a bottom plan view of the ball joint assembly housing of FIGS. 4A and 4B showing a leaf spring installed between an end of the housing horizontal arcuate slot of the bottom of the housing assembly and a side of the lever arm.

With the permanent attachment of the lever arm 55 to the jacking screw 50 that has been turned into the threaded center hole 48 of the ball seat assembly 42, followed by the mounting of the ball joint assembly housing 35 onto the base plate 30 by a turning of screws 32 through the base plate holes 30b and into the threaded holes 33, that have been formed at space intervals around the ball joint housing base end 34, the assembly of the ball joint assembly 14 has been completed. For efficiency, a non-slip locking of the ball 40 in the concave surface 37 of the ball joint housing top 36 may be desirable. However, over time and wear with use, and settling, even with the set screw 46 turned into engagement with the side of the round nut 42, an outward turning of the round nut 42 can occur whereby, even with the lever arm 55 fully turned into locking engagement, as illustrated in FIG. 4C, the purchase of the ball 40 surface in the concave surface 37 may not be adequate. To correct this problem, without dis-assembling ball joint assembly 14, the invention provides spaced radial holes 42b, shown in FIGS. 4A, 4B and in broken lines in 4C, that are sided to receive an end of an allen wrench that is for insertion through the lever arm slot 39 to have its end fitted into one of the spaced radial holes 42b, after the set screw 47 has been turned in set screw hole 46, dis-engaging it from the side of the round nut 42. With the round nut 42 loosened, an operator fits the alien wrench end through the lever arm slot 39 and into a sided radial hole 42b. The operator then manually turns the allen wrench opposite end to turn and lower the round nut 42 such that the round nut threads 48 travel along the jacking screw 50 threads, moving the jacking screw top 51 mounting the plunger 57 closer to the concave surface 37. Whereafter, the set screw 47 is turned back into set screw hole 46 into engagement with the round nut outer surface, holding the round nut in its newly adjusted position, providing a closer fit of the ball 40 in the concave surface 37 when the lever arm 55 is pivoted to lift the jacking screw 50.

Additionally, for locking the lever arm 55 in place, after tightening and release of the ball 40 in the concave surface 37, to hold the lever arm in place the invention provides a leaf spring 53 that has a V shape, as shown in FIG. 2 and in FIG. 4C. To install the leaf spring 53, the V shaped end thereof is fitted into the housing horizontal arcuate slot 39 with an outwardly folded end tab end 53b of leaf spring leg 53a positioned over the housing, and the end other leaf spring leg 53c is positioned against the side of lever arm 55. So arranged, the lever arm 55 is pivoted counter clock-wise, as seen from the bottom of the ball joint assembly housing 35 as shown in FIG. 4C, to lift the ball 40 into locked engagement with the concave surface 37. Whereafter, the leaf spring 53 is fitted into the space between the end of the horizontal arcuate slot 39 and side of lever arm 55, and is partially compressed with the leaf leg 53a tab end 53b positioned over the housing 42 surface, and the leaf straight leg 53c end in contact with the side of the lever arm 55. Thereby, the partially compressed leaf spring 53 that biases the lever arm 55 into a locked attitude where the ball 40 is held tightly on the concave surface 37. An operator, to release that clamped attitude, must turn the lever arm 55 clock-wise, shown in broken lines in FIG. 4C, to load the leaf spring 35, and release the clamping action. Upon release of a turning force on the lever arm 55, the leaf spring 53 with urge the lever arm 55 back to a clamped attitude.

The ball joint assembly 14, as described above, in combination with work holding arrangements constitutes a ball joint vice 10, as shown in FIGS. 1 and 2. Shown in FIGS. 1, 2, 3, 4A and 4B, the ball joint assembly 14 stem 15 includes a tool mounting 66 on an upper end that preferably has an arcuate outer surface 66a of a shape to fit through the housing 35 round hole and is stepped inwardly, to form a shelf 67 that receives a rectangular section of rail 75 of rifle support cradle 12, through, it should be understood, that the shelf 67 may be mounted to other work holding devices, within the scope of this disclosure, as shown and describe herein below. Shown in FIGS. 1 and 2, the rifle support cradle rail 75 extends outwardly at right angles from opposite sides of the shelf 67, and the rail itself provides for mounting a work clamping arrangement. Four holes 69 are formed through the arcuate outer surface of the tool mounting 66 that are threaded and align with holes 76 formed through the rail 75 and the rail 75 is secured in the shelf 67 by fitting screws 71 through the holes 76 that are turned in the tool mounting 66. Where the rail 75 is shown in FIGS. 1 through 6, with the rifle support cradle 12, it should be understood that other work mounting apparatus can be and, as shown in FIGS. 7 through 14, have been joined to the ball joint assembly 14 stem 15 end tool mounting 66, as set out and discussed hereinbelow.

FIGS. 1 and 2 show the ball joint assembly 14 mounted through the base plate 30 to the T-base straight flat arm 16, and the housing 35 slots 19 are shown as parallel to the that T-base cross arm 20. So arranged, by tilting or pivoting of the ball 40 to move the ball stem 15 across the ball joint housing 35 top, from one slot 19 to the other slot 19, the tool mounting shelf 67 will travel in an arc across the longitudinal axis of the T-base straight flat arm 16. Of course, within the scope of this disclosure, the housing 35 can be mounted such that the slots 19 align with the longitudinal axis of the straight flat arm 16 with the tool mounting shelf 67 to then pivot in an arc over the straight flat arm 16 longitudinal axis.

Figure 6:
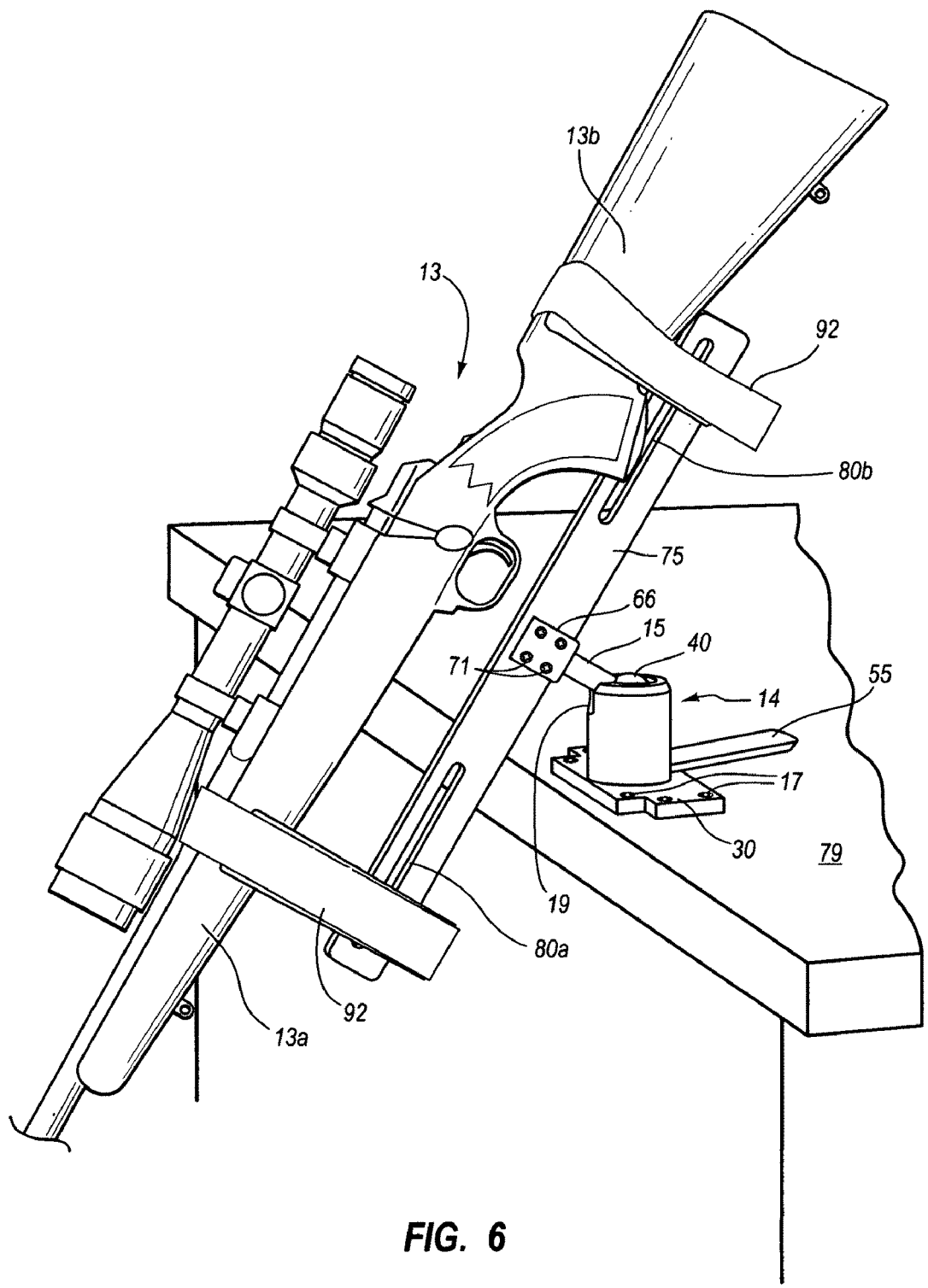
FIG. 6 shows a side elevation of the ball joint assembly cylindrical housing base attached at a base plate that is connected to a work bench, showing the ball joint assembly ball shaft or stem end attached to a rifle support rail, with the ball and ball shaft or stem shown as having been tilted across the work bench edge, showing the lever arm as having been turned to a locked attitude preventing the ball from moving.

FIG. 6 shows the ball joint housing 35 mounted onto a bench 79 by screws 17, with the ball 40 stem 15 tool mounting shelf 67 shown connected to the rail 75 by screws 71. Which ball 40 has been turned to where the rail 75 and rifle 13 mounted thereto has turned to where the top of the rifle would face an operator, not shown, in front of the bench 79, and shows ball stem 15 pivoted along the ball joint housing 35 slot 19, tilting the rifle 13 barrel end towards the floor. So arranged, the operator, not shown, would have a clear view of the top of the rifle and scope mounted thereon. Which turning of the ball 40 and tilting of the ball stem 15 is shown by arrows A and B, respectively. With the selected tilted attitude maintained when the lever arm 55 is moved so as to turn the jacking screw 50 upwardly in the threads 48 of the round nut 42, elevating the top end 57a of the plunger 57 of the jacking screw 50 into engagement with the ball 40 surface. The ball 40 is thereby urged upwardly into locking engagement with the ball joint housing 35 cap or top 36 concave interior surface 37, locking the ball 40 and concave interior surface 37 together.

The ball joint assembly 14, as described above, can be mounted onto a moveable support like the T base 11, shown in FIGS. 1 through 4B, or can be secured to a work bench, or the like, as shown in FIG. 6, within the scope of this disclosure. Also, it should be understood, the ball joint assembly 14 of the invention, and as shown herein, can mount a work holding device that can be the rifle support 11 of FIGS. 1 through 6, a pistol support, as shown in FIG. 7, a support for sighting in a rifle, as shown in FIGS. 8 through 10A, and an archery bow support, as shown in FIGS. 11 through 14, or can be used with another work support, within the scope of this disclosure.

The rifle support cradle 12, as shown in FIGS. 1 through 6, includes the rail 75 for connection, as described above, to the working holding mounting 66 by screws 71. The rail, as shown, is slotted longitudinally along its center line with forward and rear end slots 80a and 80b that, as shown best in FIG. 2, each receive a clamping mechanism fitted thereto that consists of a forearm stock support mounting 83a and a butt stock support mounting 83b that are essentially identical, with each is to receive and securely hold the rifle 13 forearm and butt stock, respectively, that are supported therein, as shown in FIGS. 3 and 6.

Figure 5A:
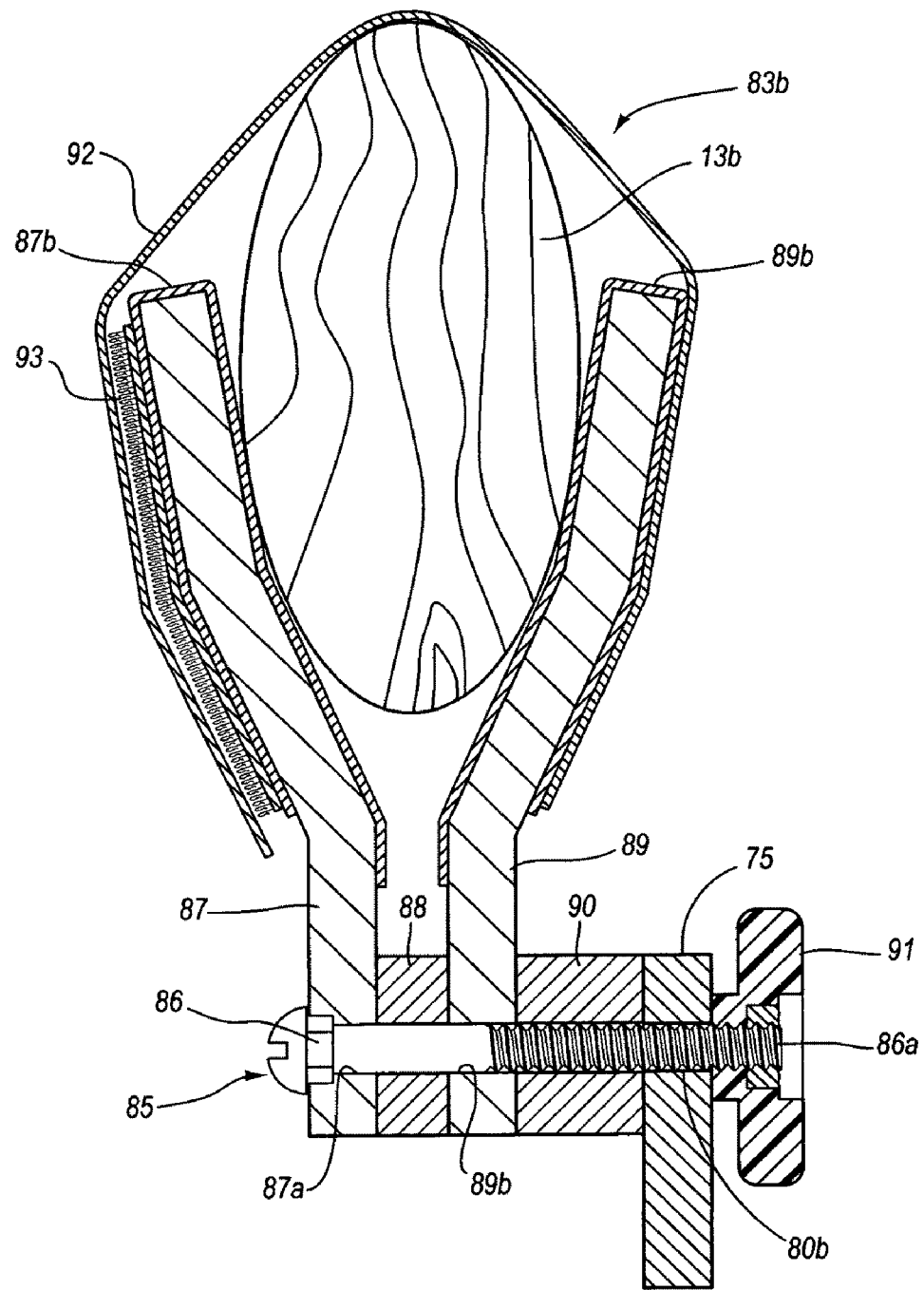
FIG. 5A shows an enlarged rear end elevation sectional view of a rifle support rail of FIG. 3 showing a rifle stock support cradle mounted thereto.
Figure 5B:
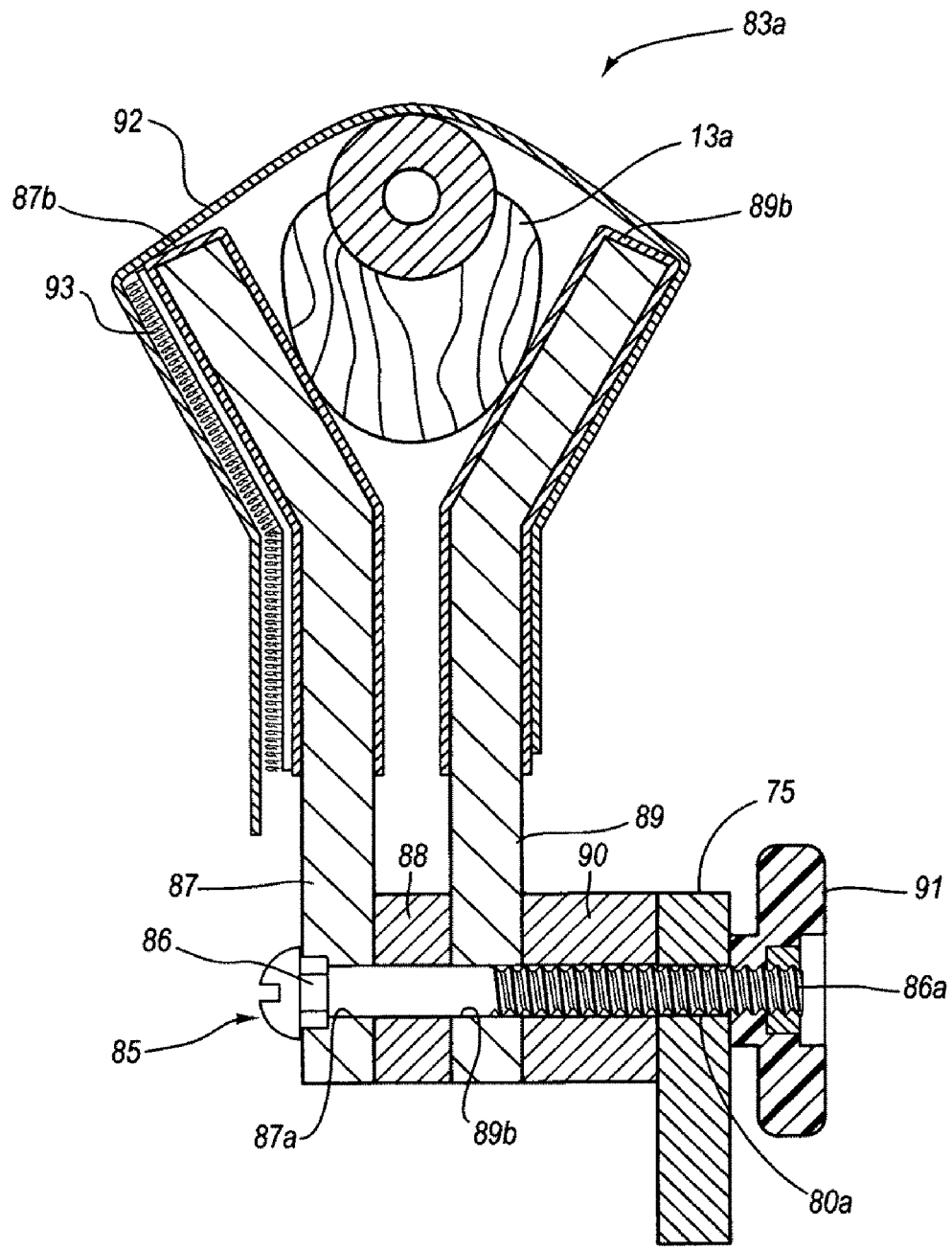

Shown in FIGS. 2, 3, 5A and 5B, the forearm stock support mount 83a and butt stock support mount 83b are each attached to the gun rail 75 by an adjustable hand bolt 85. Where each hand bolt 85, shown best in the exploded view of FIG. 2, includes a straight bolt 86 that is aligned for passage through a hole 87a formed through a lower end of an outside bracket 87; through a narrow spacer 88 and a hole 89a formed through a lower end of an inside bracket 89; through a spacer 90, through the slot 80a or 80b, and receives a broad hand nut 91 turned over a straight bolt 86 threaded end 86a. Velcro ® type hook fastener patches 93, are secured to opposing outer surfaces of the outside and inside brackets 87 and 89, respectively, that receive Velcro ® type matt sections secured to an end section of a strap 92 for attaching the strap 92 ends onto the outer surfaces of the outside and inside brackets, maintaining a rifle 13 forearm stock 13a and butt stock 13b end sections against inner padded sections 87b and 89b, respectively, of the outside and inside brackets 87 and 89, respectively, as shown in FIGS. 5A, 5B and 6.

Figure 7:
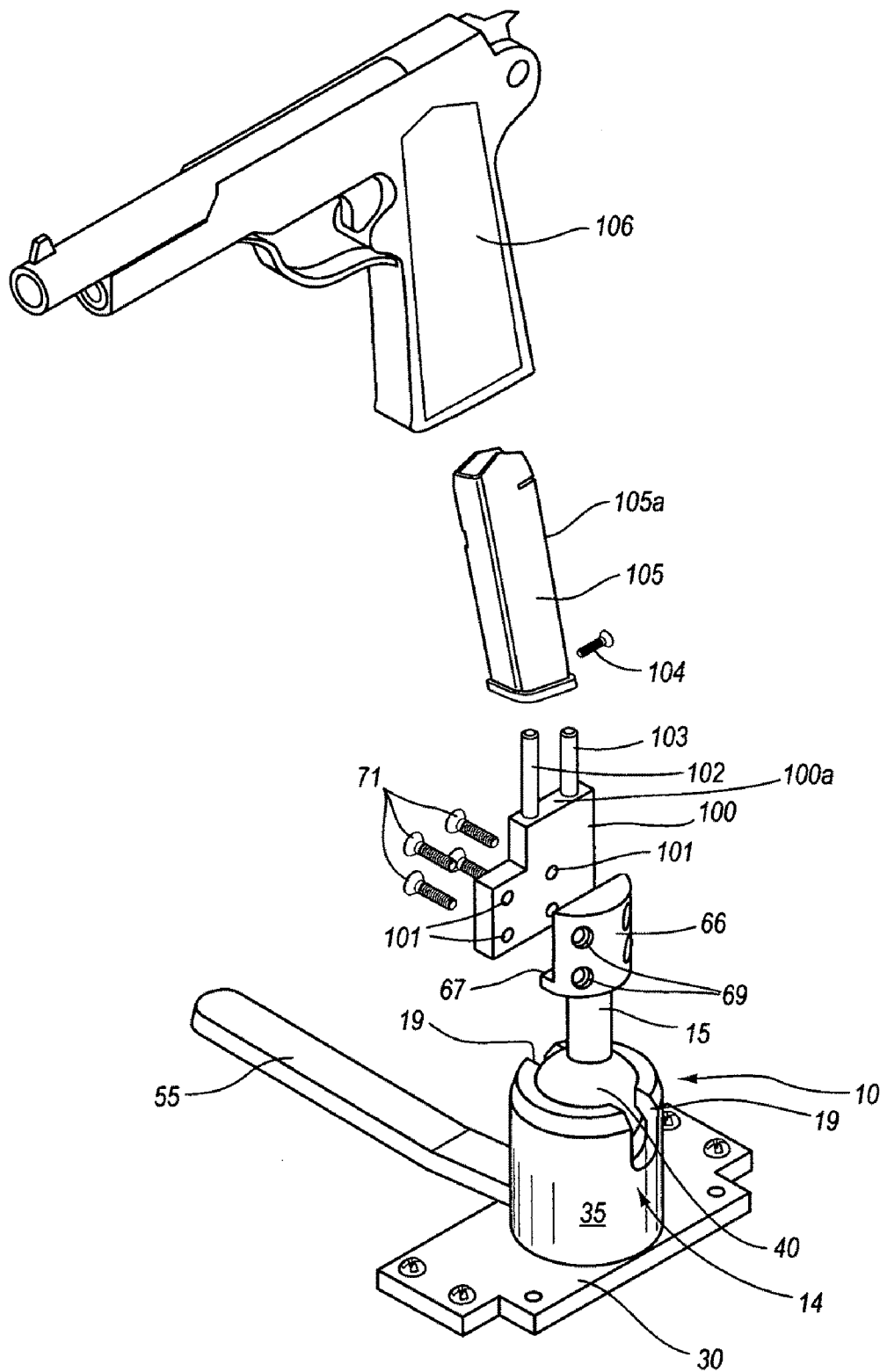
FIG. 7 shows the ball joint assembly of FIG. 1, less the T-base support, and shows the ball shaft or stem end as having been connected to a semi-automatic pistol magazine mount that is shown aligned for fitting into a pistol magazine cavity.

FIG. 7 shows the ball joint assembly 14 that includes the ball joint housing 35 mounted onto base plate 30, and shows the ball 40 surface wherefrom the stem 15 extends. The ball 40, as set out above, is capable of being turned through three hundred sixty (360) degrees, turning the stem 15 also. Which stem 15 and ball 40 can be tilted across the housing 35 top, into the opposing housing slots 19, providing an arc of travel of approximately one hundred eighty (180) degrees and more. The stem 15 is shown as including the tool mounting 66 at its top end includes the shelf 67, and has spaced holes 69 formed therethrough that are threaded to receive screws or bolts 71 turned therein. The bolts 71 are shown as aligned to fit through a pistol mounting plate 100 that fits into the tool mounting 66 shelf 67. So arranged, the bolts 71 pass through holes 101 in pistol mounting plate 100 and are turned into the threaded holes 69 for mounting the pistol mounting plate 100 to the stem tool mount 66.

FIG. 7 shows the pistol mounting plate 100 as including a pair of parallel spaced apart mounting pins 102 and 103 that extend at right angles upwardly from a top 100a of the pistol mounting plate 100, and which mounting pin 102 is shown as being slightly longer than mounting pin 103. The mounting pins 102 and 103 are for fitting into cavities or holes formed in a pistol magazine mount 105 that is pistol specific. The unequal length of mounting pins 102 and 103 provides for proper registry of the magazine mount 105 for the particular pistol 106 fitted thereon. Further, for holding the magazine mount 105 seated on mounting pins 102 and 103, a set screw 104 is provided for turning in a threaded hole formed into a rear edge 105a of the magazine mount 105 such that the set screw threaded end will engage a side of one of the mounting pins 102 or 103, with, as shown in FIG. 7, the set screw 104 threaded end is shown aligned to engage the side of the shorter mounting pin 103. It should be understood, that the magazine mount 105 is for a specific pistol and is to have the same shape and size as does a cartridge magazine cavity formed into the pistol butt.

Figure 8:
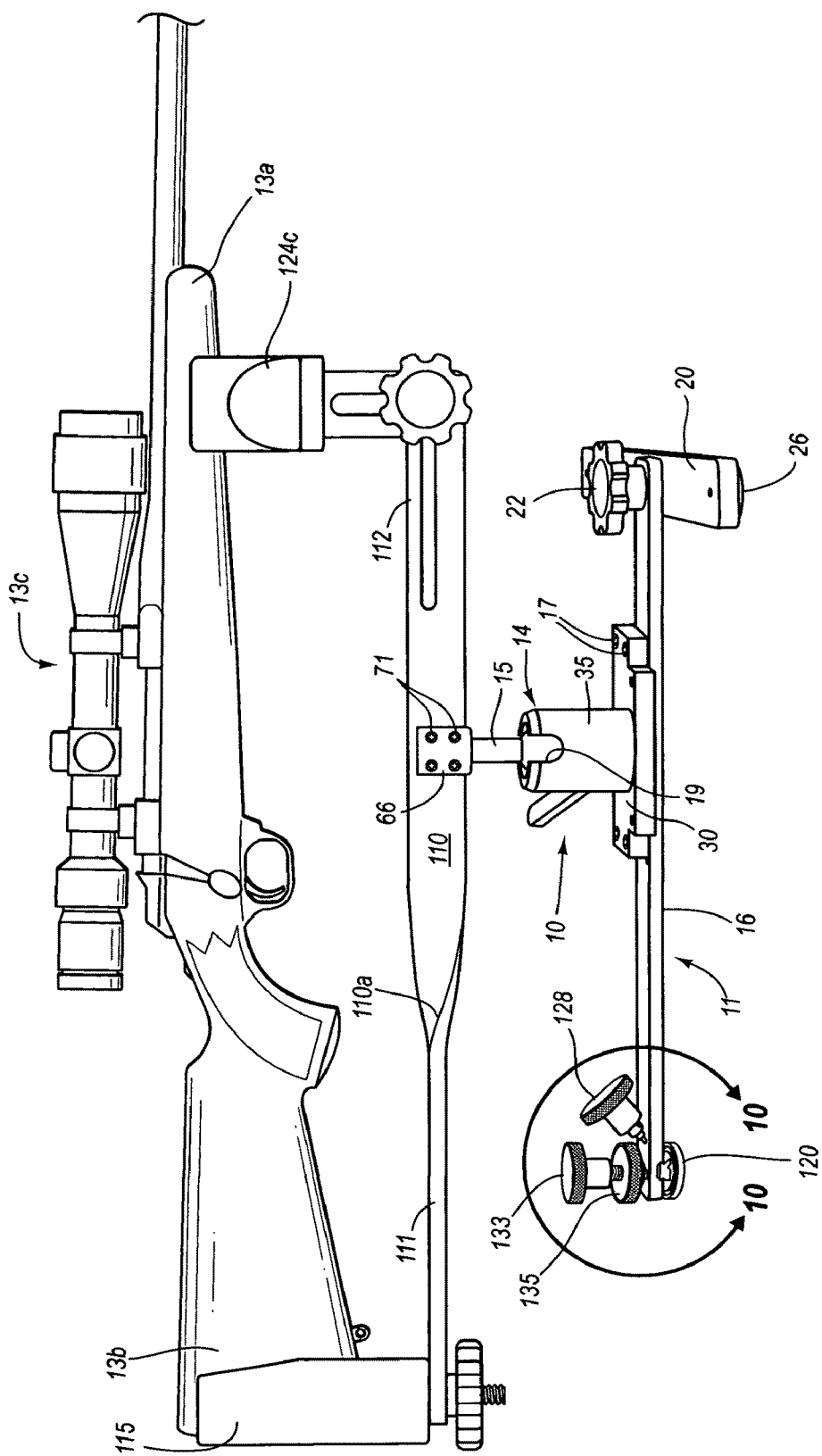
FIG. 8 shows a ball joint assembly like that of FIG. 1 with the ball assembly bottom attached to a base plate that is attached to the T-base support, and shows the ball shaft or stem end attach to a rifle support rail, of a shooting rest, showing a rifle barrel platform forward end, and showing the rifle support rail as having been twisted to an angle of ninety (90) degrees at a mid-section with a rifle butt support rest shaft attached to a rear end of the rifle support rail, and showing the T-base rear end, positioned below the rifle butt support rest, as including a mechanism for raising and lowering the T-base rear end and moving it from side to side, providing vertical and horizontal incremental movements to the rifle butt support rest for sighting in a rifle that is shown supported in the rifle barrel platform and butt support rest.
Figure 9:
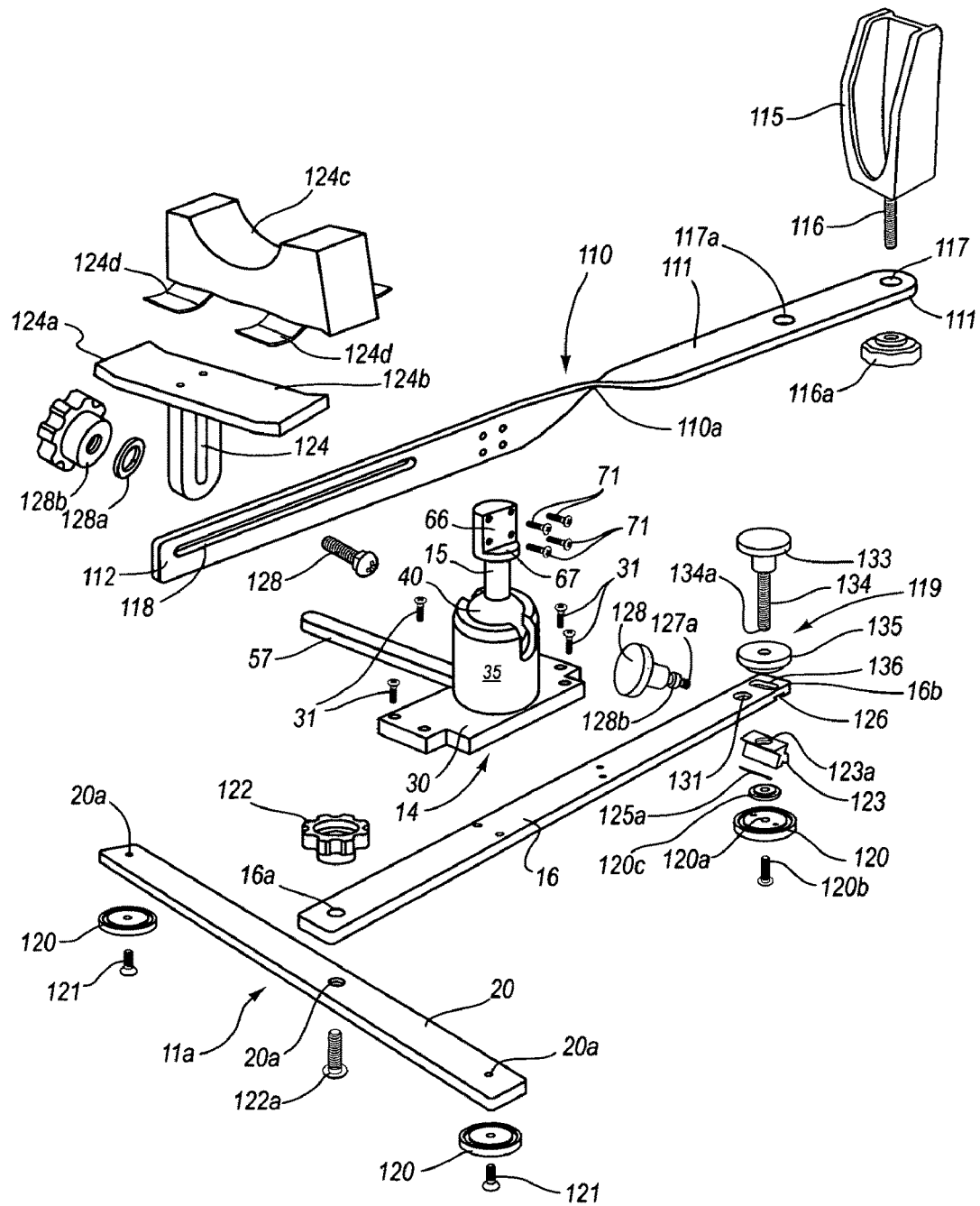
FIG. 9 is an exploded perspective view of the ball joint assembly, T-base and rifle support of FIG. 8, less the rifle.

FIGS. 8 through 10A, show a work holding device that, holds a rifle 13 like that shown in FIGS. 1 through 6, shows the ball joint assembly 14 for use with a rifle 13 holding device. Which configuration includes the ball joint assembly 14, as described, that is mounted on base plate 30 that is connected to the T-base 11a that includes the long and short cross legs 16 and 20, respectively. The work holding device of FIGS. 8 through 10A is, however, is a shooting rest for securing the rifle 13 while it is fired, for sighting in the rifle. Accordingly, rather than the rifle cradle 12 of FIGS. 1 through 6, FIGS. 8 and 9 show a rail 110 that includes a forward end 112 and a rail rear end 111, and is twisted at 110a approximately ninety (90) degrees, to where the rail rear end 111 is parallel to, and in use will be in alignment with, the T-base long leg 16. So arranged, by making incremental adjustments upwardly and from side to side to the T-base long leg 16 end 16b, these movements will be transferred into the rifle butt end, correcting elevation and windage in sighting in the rifle. Accordingly, with the rifle 13 butt end 13b held in rifle butt rest 115, the rifle scope 13c can be adjusted to reflect a strike on a target of a bullet fired from rifle 13. Unlike the butt stock support 83b of FIGS. 1 through 3, 5A and 6, the rifle butt rest 115 of FIGS. 8 and 9, is slotted to just fit onto the butt end 13b or rifle 13, holding that butt end snugly in place, prohibiting movement thereof when the rifle is fired. The rifle butt rest 115 is fixed to the rail 112 by fitting a threaded rod 116 that extends axially from a bottom end of the butt rest 115 through a hole 117 formed through the rail butt end 111 and a broad head nut 116a is manually turned thereon, locking the rifle butt rest 115 in place. For accommodating shorter rifle 13, a hole 117a is formed through the rail butt end 111, forward of the hole 117.

Like the rail 75 of FIGS. 1 through 3 and 6, the rail 110 of FIGS. 8 and 9 includes the forward longitudinal slot 118 that a locking bolt 128 is fitted through a vertical slot 124 of a rifle barrel platform mounting leg 125, and through a washer 128a with a broad head nut 128b turned over a thread end of bolt 128. The vertical slot 124 is formed along the center axis of a rifle barrel platform mounting leg 125. Tightening the broad head nut 128b onto the locking bolt 128 threaded end clamps a rifle barrel platform 124a mounting leg 125 onto the rail, locking it in place. The rifle barrel platform 124a is shown as having a flat top surface 124b that is to receive a rifle barrel rest bag 124c positioned thereon. Which rifle barrel rest bag 124c is curved from one side to the other, forming a saddle with a center depression, and is held onto the rifle barrel platform 124b with straps 124da that are wrapped around the platform and with strap 124d ends jointed together as with fasteners. The rifle barrel rest 124c is filled with a material, such as sand, rice husks, or the like, to hold a shape, such as the shape of a rifle barrel, that is pressed into it. So arranged, with the rifle butt maintained in tight fitting engagement within the rifle butt rest 115, and with the rifle barrel pressed into the rifle barrel rest, bag 124c, when the rifle is fired, it will not shift its location. Accordingly, with the rifle 13 steadied, as shown, in FIG. 8, a lifting or lowering or side to side movement of the T-bar long leg 16 rear end 16b will move the butt rest 115 and rifle butt end 13b also.

To provide for incremental lateral and horizontal movement of the butt rest 115 wherein the rifle 13 butt end 13b is maintained, the T-base long leg 16 end 16b is positioned on a foot 120 that is axially mounted onto a pin 120b to turn freely. The foot 120 is a flat disk having a center hole that pin 120a is turned through, through a plate 120c and is turned into a threaded hole 120d in the end of a bolt 134 after the bolt has turned through a threaded passage 123a formed through a dove tail block 123, as set out below. The foot 120 is essentially the same as feet 120, but is functionally different in that it is arranged to be turned around its center axis coupling to bolt 120b.

The feet 120 secured to the ends of the short leg 20 by threaded bolts 121 that are turned into threaded holes 20a formed in the short leg 20 ends. Like the T-base of FIGS. 1 through 6, the long leg 16 is connected to the middle of the short leg 20 of FIGS. 8 and 9. However, the T-base 11 a coupling of the long leg 16 to the center of the short leg 20 needs to be easily released and re-tightened to allow the short T-base rear end to move back and forth, and accordingly, the coupling of the long leg 16 end 16b to the middle of short leg 20 is preferably with a bolt 122a that is fitted through a hole 20a and through hole 16 and receives a broad head nut 122 turned thereon.

Shown in FIGS. 8 through 10A, a windage and elevation assembly 119 is provided for moving the T-base long leg rear end 16b vertically and across the foot 120. The foot 120 includes a threaded bolt 120b fitted through a hole 120a and platform 120c and is turned into the threaded longitudinal hole 120d, shown in FIG. 10A, formed into the bolt 134 end 134a. Thereby the foot 120 is free to turn on the end of bolt 134, turning on the plate 120c. The foot 120 thereby remains stationary, and does not rotate as the bolt 134 is turned by manually turning a broad head 133 end of the bolt 134, as discussed below.

The bolt 134 is turned through a broad head lock nut 135, is fitted through an elongate slot 136 formed across the long leg rear end 16b, and is turned through a threaded hole 123a formed through the brass dove tail block 123, to where the end of the bolt 134 engages the plate 120c. So arranged, when the bolt 134 is turned it elevates or lowers the brass dove tail block 123 and pivots the plate 120c, without turning the foot 120. The brass dove tail block 123 is, as set out below, connected to the long leg rear end 16b and moves therewith, providing for vertical movement of the long leg rear end 16b and connected rifle butt rest 115. This allows an operator to make elevation changes to the rifle butt 13b by turning the bolt broad head 133 that is shown as scored around its outer edge to facilitate gripping by an operator. With, when an operator is satisfied with the vertical adjustment, and has moved the dove tail block 123 horizontally to adjust for windage, as discussed in detail below, they can turn the broad head lock nut 135 into engagement with the top of the long leg rear end 16b surface, locking the vertical and horizontal settings in place.

Figure 10:
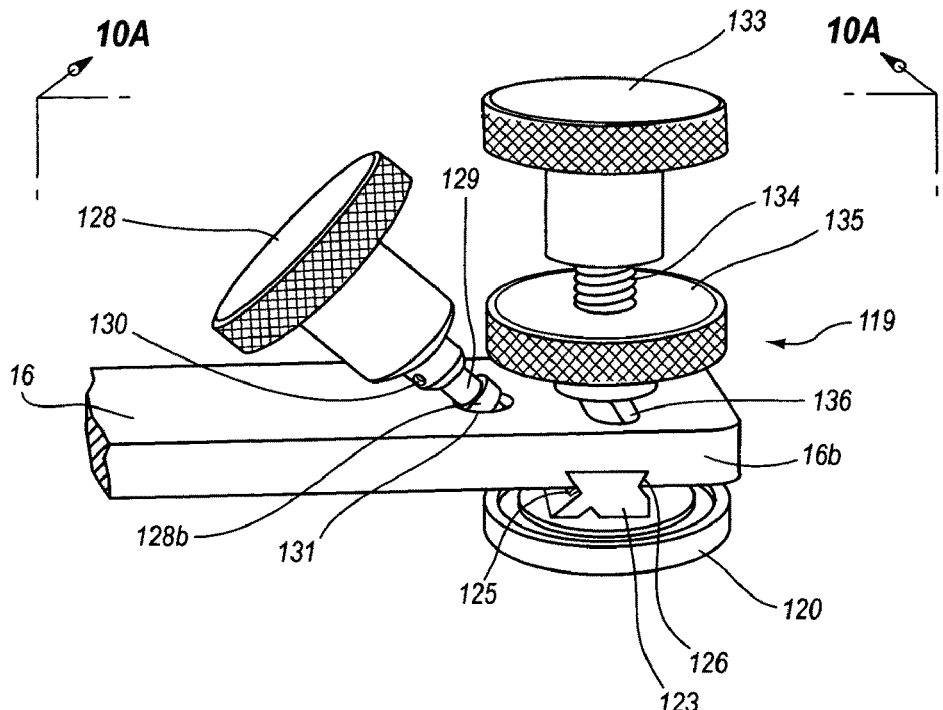
FIG. 10 is an enlarged perspective view taken with the line 10-10 of FIG. 8, showing the vertical and horizontal movement knobs mounted to the movable T-base rear end and the T-base rear end foot.
Figure 10A:
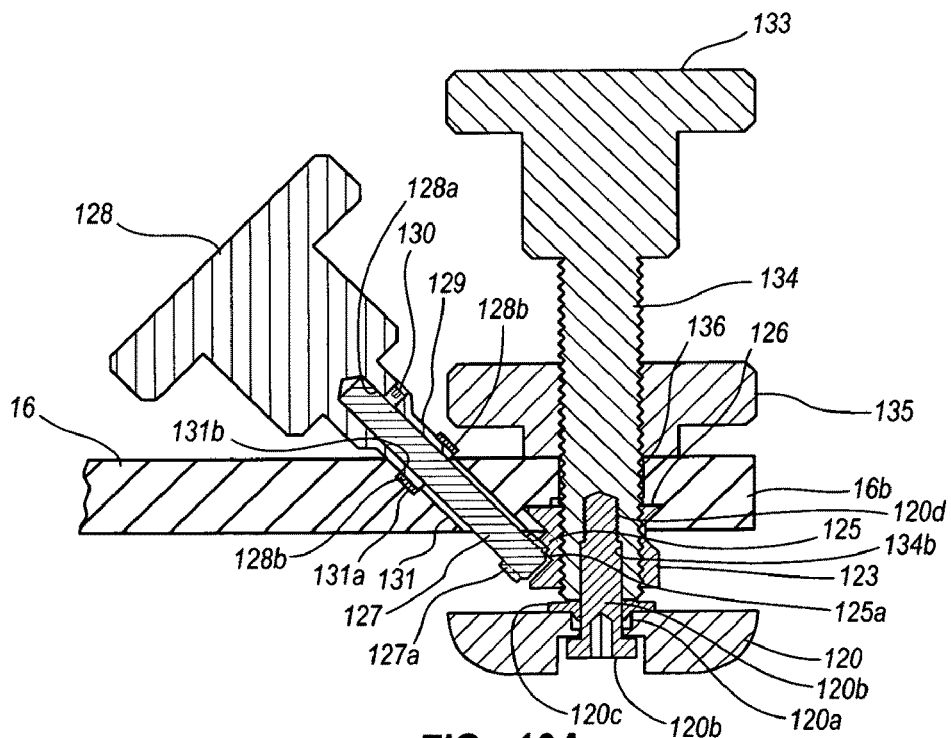
FIG. 10A is a vertical sectional view taken along the line 10A-10A of FIG. 10.

The brass dove tail block 123 is arranged to allow horizontal side to side movement to the long leg 16 end 16b that includes the elongate slot 136 formed therethrough that allows for travel of the bolt 134 along the slot 136 sides when the dove tail block is moved horizontally. Shown in the exploded view of FIG. 9 and in FIGS. 8, 10 and 10A, the brass dove tail block 123 top is fitted, to travel from side to side in a slot 126 that is formed across the undersurface of the long leg 16 end 16*b* that the threaded hole 123*a* is centered in. Shown in FIG. 10A, to provide for which back and forth travel, a rack 125, that is shown as a narrow rectangular section with teeth 125*a* formed along an outer edge, is a component of a rack and pinon gear arrangement. The rack 125 is preferably formed from brass, to fit across the upper forward facing V side of the brass dove tail block 123, and is secured thereto as with screws such that the rack 125 teeth 125*a* extend outwardly and are approximately perpendicular to the dove tail block 123 lower forward facing side. So arranged, a shaft 127 that, as shown in FIG. 10A, as a shaft with pinion gear teeth 127*a* formed on its lower end that are in meshing engagement with the rack teeth edge 125*a*, is mounted to turn in a slanted hole 131 that is formed from the top of the long leg 16 end 16*b*, adjacent to the hole 136 and exits proximate to a lower face of the dove tail block, and the rack 125 is mounted to the upper face of that dove tail block. Thereby, the pinion gear end 127*a* of shaft 127 are in meshing engagement with the teeth 125*a* of the rack 125. Shown in FIG. 10A, the shaft 127 top portion is fitted into a sleeve 129 that a collar 128*b* is secured onto the end thereof, and the sleeve 129 terminates in a necked down portion of a knob 128. A set screw hole 128*a* is formed into the knob 128 necked down portion that a set screw 130 is turned into to maintain the knob 128 onto the shaft 127. For maintaining the shaft 127 in the slanted hole, with the teeth of the pinion gear end 127*a* in meshing engagement with the rack teeth 125*a*, the end of the knob 128 necked down portion includes a collar 128*b* that fits into and is held by an edge 131*b* of a groove 131*a* that is turned into the head end of the slanted hole 131, as shown best in FIG. 10A. So arranged, prior to securing the rack 125 onto the dove tail block 123 face, the shaft 127 and sleeve 129 collar end 128*b* can be fitted into the slanted hole 131 with the collar end 128*b* to pass across the groove 131*a* edge 131*b*. After instillation of the rack 125, and with the shaft teeth end 127*a* in meshing engagement with the rack teeth 125*a*, the groove 131*a* edge 131*b* will block withdrawal of the shaft 127, while still allowing the collar end 128*b* to turn freely in groove 131*a*.

In practice, a turning of the locking nut knob 135 into engagement with the top or the long leg 16 end 16*b* will both hold the vertical attitude of the bolt 134 and, due to the lifting force applied onto the bolt 134 the brass dove tail block 123, the rack 125 teeth 125*a* are pulled into binding engagement with the teeth of the shaft end 127*a*, locking the long leg 16 end 16*b* in place.

So arranged, the turning of the knob 128 moves the T-base 11*a* long leg end 16*b* to the right or left. In which right of left travel, the bolt 134 moves along the elongate slot 136 formed in the long leg 16 end 16*b*, allowing for dove tail block travel between the elongate slot 136 ends.

Figure 11:
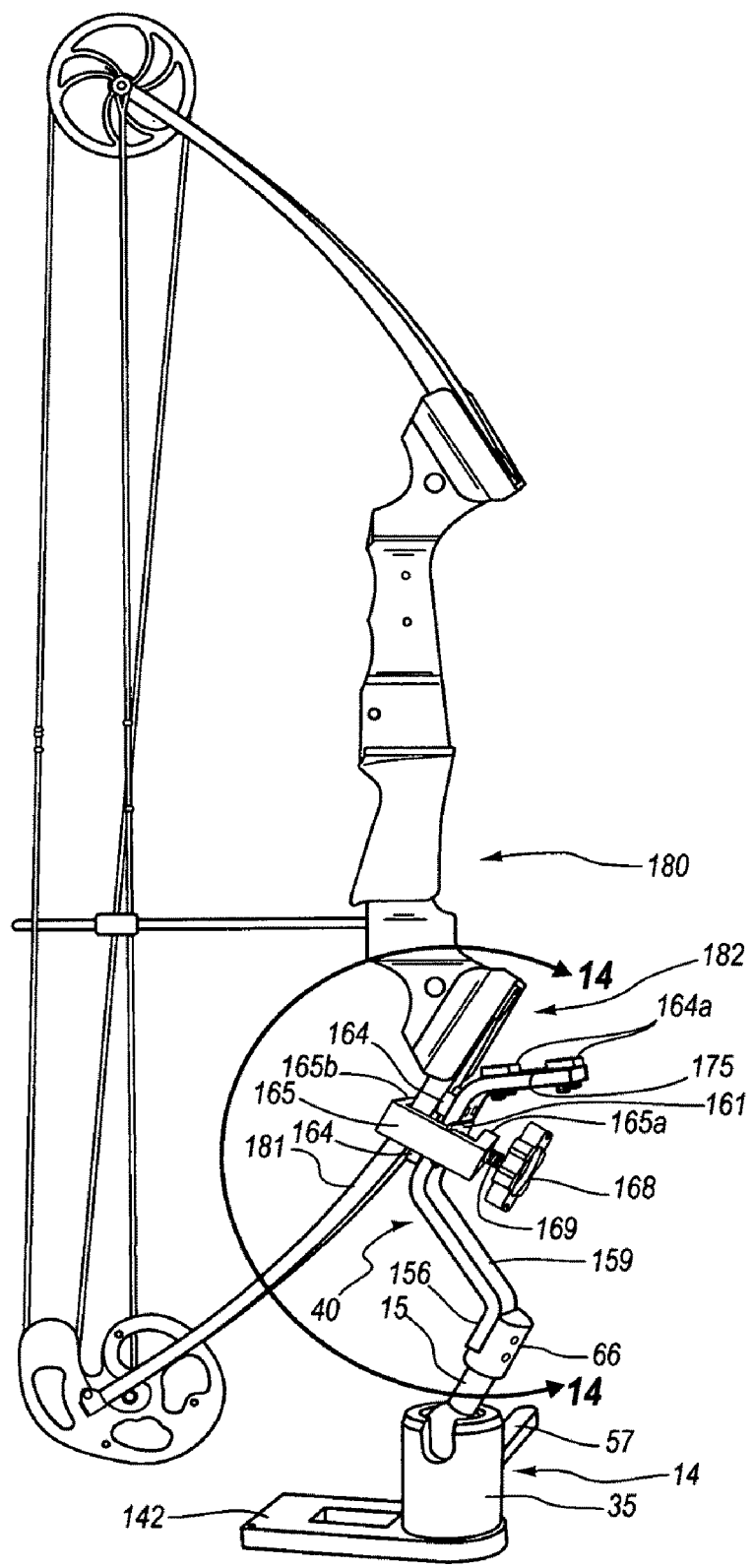
FIG. 11 shows the ball joint assembly of the invention mounted to an archery bow holder that is arranged for clamping onto a limb of an archery bow to hold it in a vertical attitude, and provides for off-setting the bow from the axis of the ball joint shaft or stem to facilitate an operator working on the archery bow.
Figure 12:
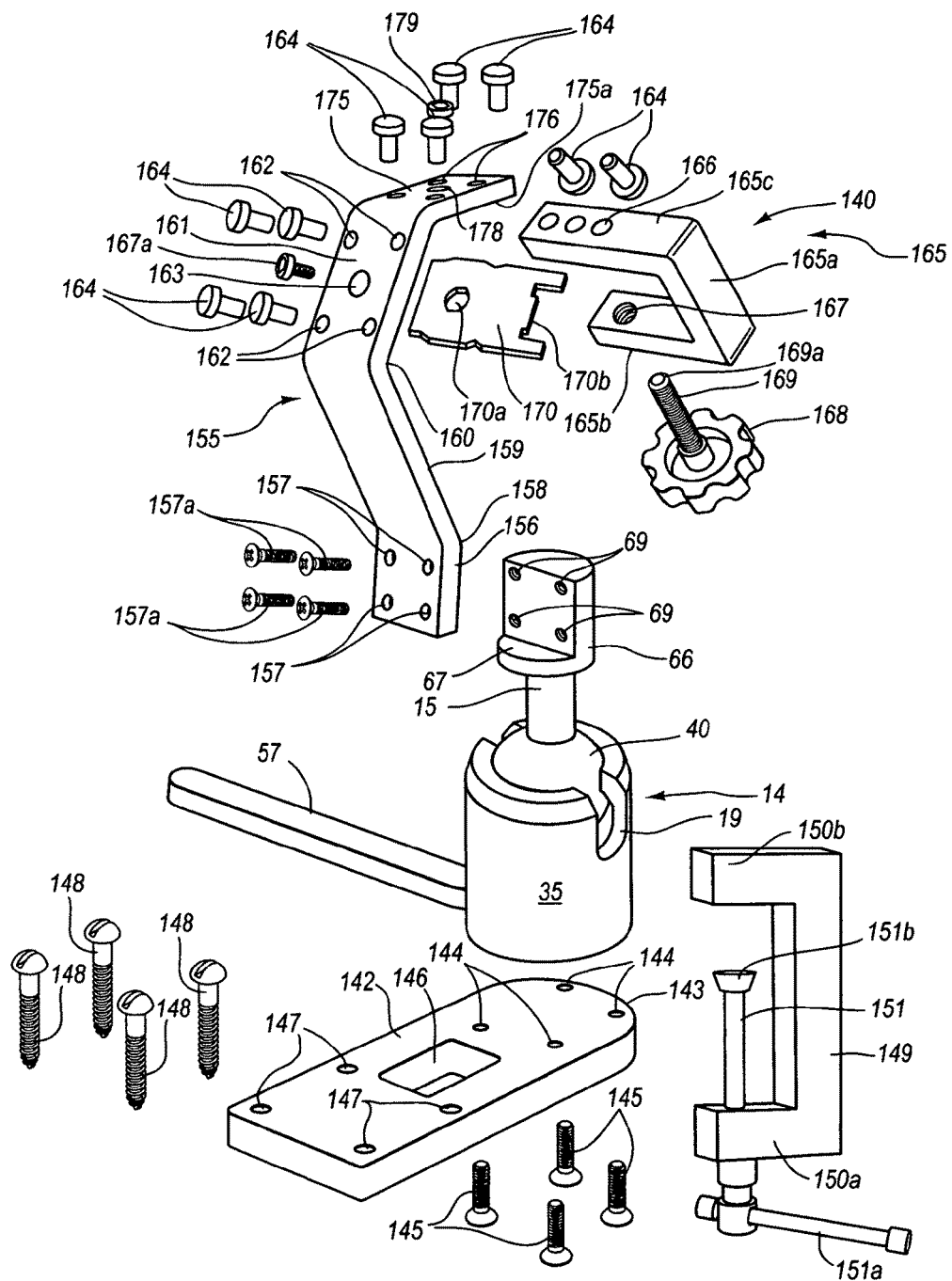
FIG. 12 shows an exploded view of the ball joint assembly, table mount and bow clamping assembly of FIG. 11.
Figure 13:
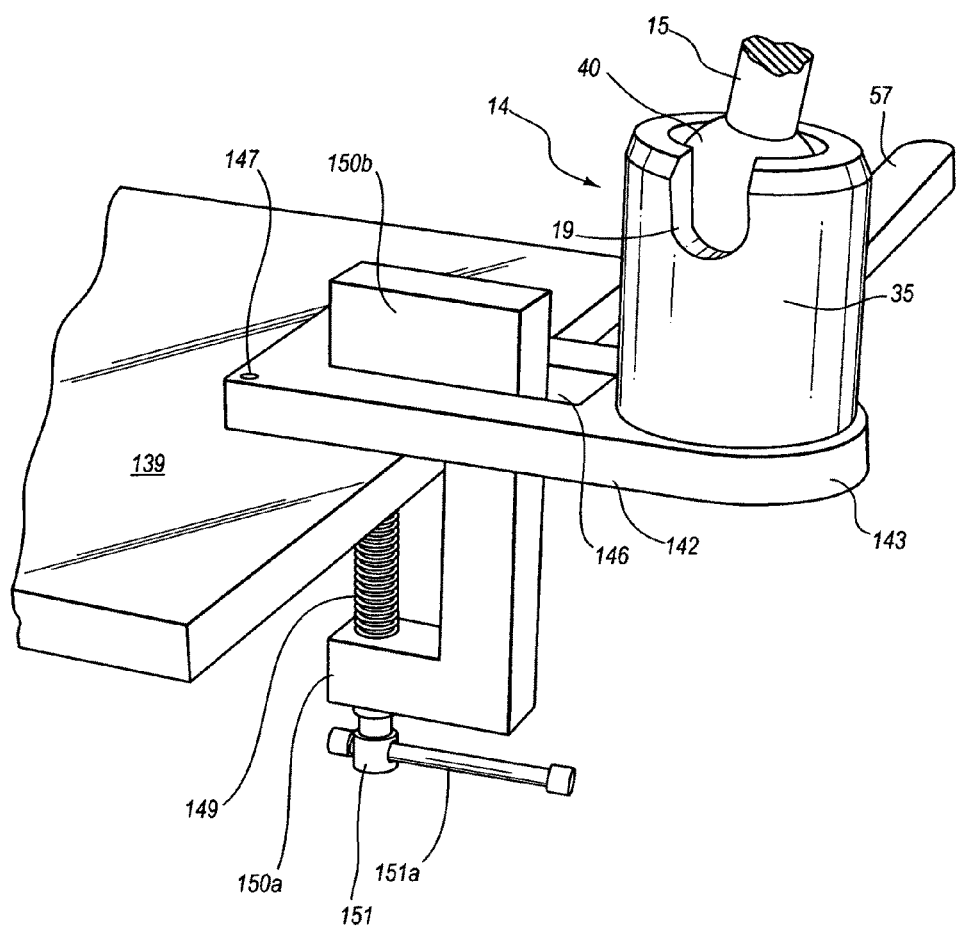
FIG. 13 is an enlarged side elevation perspective view of the table mount of FIGS. 11 and 12, shown mounted onto an edge of a bench top.

FIGS. 11 through 14, show another utilization of the ball joint assembly 14 of the invention for holding an archery bow mount 140. Unlike the earlier set out utilizations of the ball joint assembly 14 that mount to the various work holding device, where the working holding device is mounted to, or rests on, a flat surface such as a bench or table 139, the archery bow mount 140 needs to be positioned to hold a bow outwardly from the table or bench edge, allowing the bow lower limb 181 to be forward of, and extend across the table or bench edge. Accordingly, as shown in FIG. 13, the ball joint assembly 14 includes a base 142 whose outer edge 143 is rounded to accommodate the cylindrical ball joint assembly body 35 and, as shown in FIG. 12, has spaced holes 144 formed therethrough that screws 145 are fitted through and turned into the threaded holes 33 formed at spaced intervals around the housing lower edge 34, as shown in FIGS. 4A and 4B. Shown best in FIGS. 12 and 13, a C-clamp 149 is provided for attaching the base 142 onto an edge of the bench or table 139. To provide which mounting, a clamp top leg 150*b* is fitted through a rectangular center hole 146 formed through the base 142, and the top leg 150*b* of the C-clamp is positioned on top of the bench or table at its edge. A straight handle 151 a is fitted through one an end of a threaded rod 151 that has been turned through a threaded hole formed through a lower leg 150*a* of the C-clamp. So arranged, by turning handle 151*a* an opposite engagement end 151*b* of the threaded rod is moved towards an undersurface of the bench or table 139. Further, where a permanent mounting of the base 142 onto the bench or table 139 is desired, as shown in FIG. 12, the base is provide with spaced holes 147 that each receive a screw 148 passed therethrough and turned into the top of the bench or table.

Figure 14:
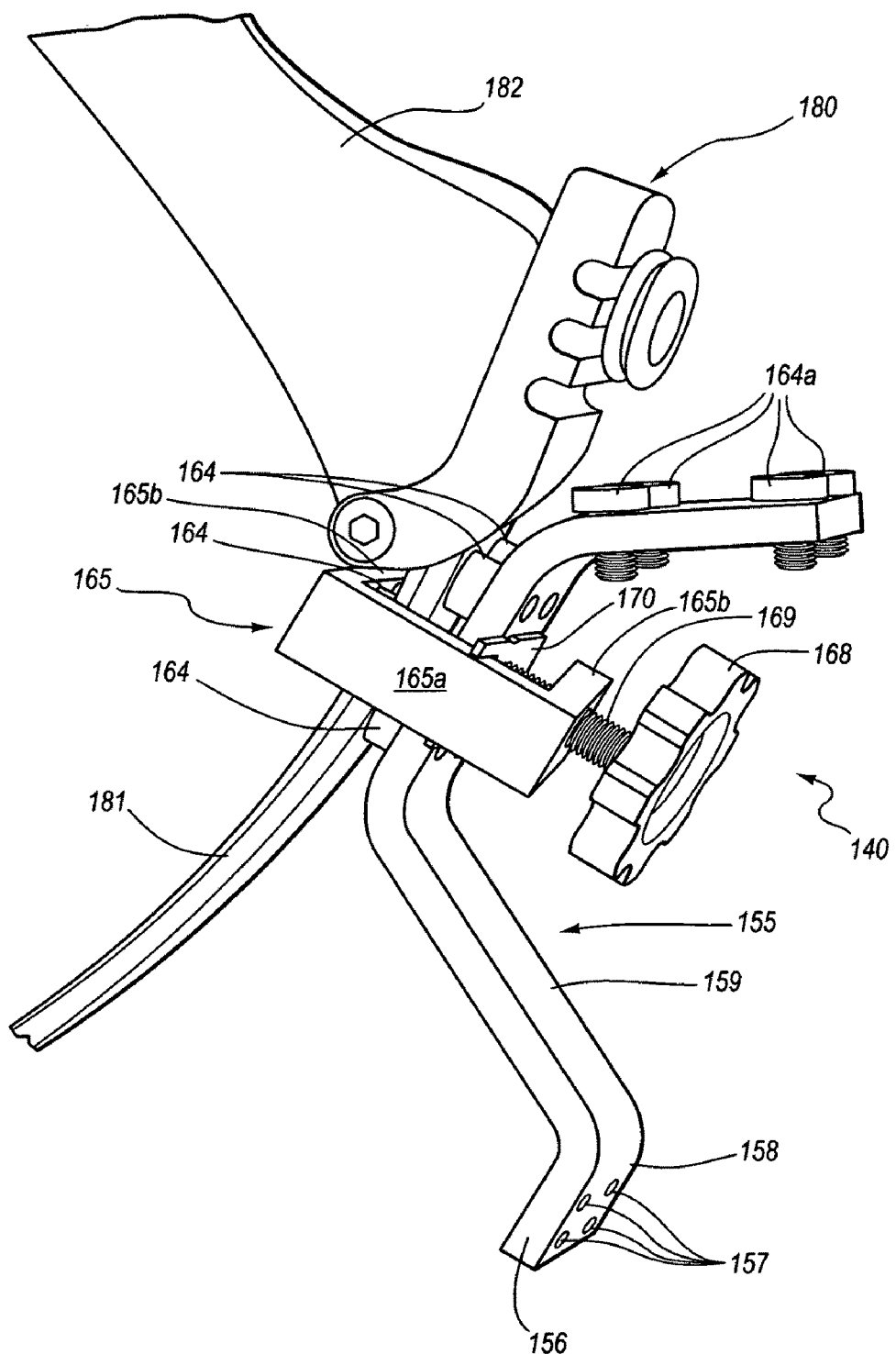
FIG. 14 is an enlarged sections view taken within the line 14-14 of FIG. 11, showing the clamping assembly and C-clamp thereof supporting a section of a lower bow limb.

With the ball joint assembly 14 installed to the edge of the bench or table 139, a main beam 155, that has a flat lower end 156, is fitted onto the step 67 of the ball joint assembly 14 coupling end 66 of the shaft or stem 15, and screws 157*a* are passed through holes 157 in a flat lower end 156 of the main beam 155, and are turned into the threaded holes 69 formed in which coupling end 66. The main beam 155 is thereby coupled to the ball joint assembly stem 15 coupling end 66 such that a first lower dog leg bend 158 in the main beam 155 displaces a main beam mid-section 159 of the main beam towards an operator when that operator is positioned in front of the ball joint assembly 14. Spaced upwardly from the dog leg bend 158, is a second dog leg bend 160 that is formed across the main beam 155, that positions a rectangular main beam mounting section 161 so as to be essentially parallel to the main beam flat lower end 156, and includes four spaced corner holes 162 and a center hole 163. The four spaced corner holes 162 are each to receive a cushioning pad 164 that are each flexible, have cylindrical bodies to fit in each of the four spaced corner holes 162 and have rounded disk shaped heads that extend above the surface of the rectangular main beam mounting section 161. The cushioning pads 164 heads are to engage and somewhat compress against a forward surface of an archery bow 180 lower limb 181, holding the bow limb 181 securely without damaging the limb surface, as shown in FIGS. 11 and 14.

A shoulder screw 167*a* is shown in FIG. 12 that has an alien wrench head and is for fitting through the hole 163 formed through the main beam mounting section 161, travel through a round opening 170*a* formed through a guide plate 170 to turn into a threaded end 169*a* of a bow engaging C-clamp tightening screw 169 that has a broad end 168 for hand turning by an operator. The bow engaging C-clamp tightening screw 169, with the shoulder screw 167*a* turned into its threaded end 169*a* holds the guide plate 170 in place, with a saddle 170*b* formed into a side of the guide plate 170, for supporting a web section 165*a* of C-clamp 165. With a turning of the tightening screw 169 in a threaded hole 167 in the base or bottom leg 165*b* the tightening screw 169 is moved across the C-clamp 165, the top leg 165*c* of the C-clamp 165, towards the main beam mounting section 161, as shown in FIG. 14, clamping, as shown in FIG. 14 clamping a limb 181 of a compound bow 180 against cushioning pads 164. In which turning of the tightening screw 169, the edge of the screw at threaded hole 169*a*, that the shoulder screw 167*a* is turned into, engages the edge of the opening 170*a* through the guide plate 170 and urges the main beam mounting section 161 towards the C-clamp 165 top leg 165c inner surface. Accordingly, elevating the clamp tightening screw 169 by turning of the broad end 168 thereof draws a top leg 165c of the bow engaging C-clamp towards the main beam mounting section 161, clamping the bow 180 limb 181 therebetween. The bow engaging C-clamp top leg 165c includes spaced openings 166 that are each to receive a cushioning pad 164 fitted therein, such that each of the cushioning pads heads extends outwardly from the inner surface of the top leg 165c so as to contact an inner surface of the archery bow 180 lower limb 181, as shown in FIGS. 11 and 14. So arranged, with the bow engaging C-clamp 140 top leg 165c moved to where the archery bow 180 lower limb 181 inner surface engages the heads of the cushioning pads 164, securely clamping the bow limb 181 to the main beam mounting section 161, facilitating an operator working on the bow. Additionally, a top section 175 of the main beam 155 is shown at 175a bent away from end of the bow 180 grip 182. The top section 175, like the main beam mounting section 161, includes four spaced corner holes 176 and a center hole 178, which corner holes 176 are to receive cushioning pads 164a that are like, and serve the same purpose as, cushioning pads 164, and the center hole 178, like the center hole 163, is to receive the tightening screw 167a fitted therein. The top section 175 provides an alternative bow limb mounting site to main beam mounting section 161. In practice, to position the bow limb 181 onto the top section 175, the C-clamp 165 is released from its mounting to the main beam mounting section 161 by releasing the tightening screw 167a out of the threaded end of 169a of the tightening screw 169 and turning the tightening screw 169 head end 168 to release the guide plate 170, and then removing the bow limb 181 off of the cushioning pads 164. The C-clamp 165 is then turned to where the C-clamp 165 top leg 165c is over the top section 175 and the tightening screw 167a is fitted through the center hole 178, through the guide plate 170 opening 170a, and is turned into the threaded end 169a of the tightening screw 169. With the bow limb 181 fitted onto the cushioning pads 164a the tightening screw 169 head 168 end, draws the C-clamp top leg 165c inner surface wherefrom the cushioning pads 164a fitted into holes 166 extend, onto a limb 181 of bow 180 fitted therebetween. The bow limb 181 is thereby clamped between the top leg 165c cushioning pads 164a and the top section 175 cushioning pads 164.

FIGS. 1 through 3 and 6 through 14, show that the ball join assembly 14 of the invention can be utilized with a number of work holding devices holding a variety of items to include, but not limited to rifles, pistols and archery bows, and show arrangements of a shooting rest and archery bow mount that themselves are unique.

Although preferred embodiments of the invention have been shown and described herein, it should be understood that the present disclosure is made by way of example only and that variations are possible, within the scope of this disclosure, without departing from the subject matter coming within the scope of the following claims and reasonable equivalency thereof, which claims we regard as our invention.

We claim:

1. A bail joint assembly comprising, a base and means for attaching said base to a work surface or a stand; a cylindrical housing and means for attaching a bottom of said cylindrical housing to a top surface of said base, and said cylindrical housing includes a lateral slot formed around an arc of less than ninety degrees adjacent to said base; which said cylindrical housing is open across its bottom end, includes a top having a concave inner surface, a center opening and a pair of slots that align across said cylindrical housing that intersect said cylindrical housing center opening, and said cylindrical housing concave inner surface has a like arc to the curve of the outer surface of a ball that has a diameter to fit into said cylindrical housing and is slid therein, into engagement with said concave inner surface, and which said ball has a straight shaft or stem extending outwardly from said ball surface that fits through said cylindrical housing top center opening and will slide along each of said aligned slots, between ends of said slots, when said ball is tilted, traveling in an arch of approximately one hundred eighty degrees across said cylindrical housing top; means for elevating said ball located within said cylindrical housing that includes a round nut with a threaded center passage that a jacking screw is turned through that includes a plunger on a top end for engaging said ball surface, and is secured to an end of a handle on its lower end that extends through said housing lateral slot for gripping by an operator; said round nut has a smooth cylindrical outer surface for siding into said housing bottom end after turning said jacking screw into said round nut threaded center passage; means for maintaining said round nut positioning in said cylindrical housing such that, turning said handle that is mounted to said jacking screw and extends out from said housing side, less than ninety degrees, elevates said jacking screw plunger onto said ball, urging it into locking engagement with said cylindrical housing top concave inner surface; a spring means having an apex with outwardly sloping legs for installation into and is held in place in the cylindrical housing lateral slot between an end wall of said lateral slot and the side of said handle to bias said handle to turn the jacking screw to urge the ball against the cylindrical housing top inner concave surface, and said spring means, when said sloping legs are squeezed towards one another, load to resist handle travel when said handle is moved to release said ball from a locking attitude against said housing top inner concave surface; and coupling means on an outer end of said straight shaft or stem for mounting a work holding device.

2. The ball joint assembly as recited in claim 1, wherein the means for maintaining said round nut positioning in said cylindrical housing is a snap ring installed in a groove formed around the inner surface of the cylindrical housing; and a set screw is turned through a threaded hole through said cylindrical housing to lock said round nut in position.

3. The ball joint assembly as recited in claim 1, wherein the spring means is formed in a V shape where the legs of said spring means are individually in contact with the end wall of the lateral slot and the side of the handle, respectively, and the legs when closed together with movement of said handle to release said ball from the locking attitude, are loaded to urge said handle back to a locking attitude.

4. The ball joint assembly as recited in claim 1, further including, spaced radial holes are formed at equal interval into the bottom of the cylindrical housing that are sided to receive an end of an alien wrench fitted through the lateral slot formed through said cylindrical housing bottom section for turning the round nut so as to elevate it on the jacking screw for adjusting the spacing distance of the top surface of the plunger installed onto the top end of said jacking screw to the ball to improve purchase of the ball surface to the said cylindrical house top inner concave surface.

5. The ball joint assembly as recited in claim 1, wherein the coupling means formed on the outer end of the straight shaft or stem is a shelf formed across said shaft or stem and spaced from said shaft or stem outer end, which said shelf includes spaced threaded holes formed through said shaft or stem above said shelf; and fastener means for turning through holes in a clamping mechanism and into said spaced threaded holes.

6. The ball joint assembly as recited in claim 1, further including a T-base formed from a first short flat section of material and a second long flat section of a material where an end section of said second long section is connected to the middle of said first short flat section, forming a cross; and means for mounting the base to a mid-section of said second long section.

7. The ball joint assembly as recited in claim 6, further including a gun rail that is a flat straight narrow section of a material; means for mounting said gun rail to the shaft or stem coupling means; a forearm stock support mounting and a butt stock support mounting that are each arranged for longitudinal attachment to said forward and rear sections, respectively, of said gun rail.

8. The ball joint assembly as recited in claim 7, wherein the gun rail includes first and second slots formed, respectively, in the said forward and rear sections of said gun rail, where said forward section first slot receives a clamp of the forearm stock support mounting and said rear section second slot receives a clamp of the butt stock support mounting and feet are fitted to the bottom end surfaces of the T-base first short flat section and the end of the second long section, opposite to the pivotal connection.

9. The ball joint assembly as recited in claim 1, further including a pistol mounting plate means for connection to a shaft or stem shelf that includes spaced pins that extend outwardly from a top surface that are for fitting into holes formed in a base of a magazine mount that has the same dimensions as a pistol magazine cavity.

* * * * *